United States Patent
Su et al.

(10) Patent No.: US 11,722,337 B2
(45) Date of Patent: Aug. 8, 2023

(54) DATA TRANSMISSION METHOD AND APPARATUS

(71) Applicant: Huawei Technologies Co., Ltd., Shenzhen (CN)

(72) Inventors: Wei Su, Chengdu (CN); Xing Hu, Shenzhen (CN); Chiwu Ding, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/701,145

(22) Filed: Dec. 2, 2019

(65) Prior Publication Data

US 2020/0186391 A1 Jun. 11, 2020

Related U.S. Application Data

(63) Continuation of application No. 15/068,518, filed on Mar. 11, 2016, now Pat. No. 10,511,460, which is a
(Continued)

(51) Int. Cl.
*H04L 12/66* (2006.01)
*H04L 12/46* (2006.01)
(Continued)

(52) U.S. Cl.
CPC ............ *H04L 12/66* (2013.01); *H04L 12/462* (2013.01); *H04L 41/0226* (2013.01);
(Continued)

(58) Field of Classification Search
CPC ....... H04L 12/66; H04L 12/462; H04L 47/41; H04L 69/324; H04L 29/08027; H04L 41/0226; H04L 2001/0093; Y02D 30/50
See application file for complete search history.

(56) References Cited

U.S. PATENT DOCUMENTS 5,745,837 A 4/1998 Fuhrmann
5,991,308 A 11/1999 Fuhrmann et al.
(Continued)

FOREIGN PATENT DOCUMENTS

CN 1529962 A 9/2004
CN 1692582 A 11/2005
(Continued)

OTHER PUBLICATIONS

Wu et al., "Best Mapping for LDPC Coded Modulation on SISO, MIMO and MAC Channels," WCNC 2004, IEEE Communications Society, pp. 2428-2431, Institute of Electrical and Electronics Engineers, New York, New York (2004).
(Continued)

*Primary Examiner* — Jung H Park
(74) *Attorney, Agent, or Firm* — Leydig, Volt & Mayer, Ltd.

(57) ABSTRACT

Embodiments of the present disclosure provide a data transmission method, which meets a requirement for an Ethernet network with diversified rate levels. The method includes: grouping media access control (MAC) layer data into a plurality of MAC layer data groups; allocating, according to a bandwidth required by a target MAC layer data group and a reference bandwidth of a logical channel, at least one target logical channel to the target MAC layer data group; encoding the target MAC layer data group to generate target physical layer data, where the target logical channel corresponds to the target MAC layer data group and the target physical layer data; and sending the target physical layer data and first indication information, where the first indication information is used to indicate a relationship between the target physical layer data and the target logical channel.

15 Claims, 7 Drawing Sheets

Related U.S. Application Data continuation of application No. PCT/CN2013/083494, filed on Sep. 13, 2013.

(51) Int. Cl.
*H04L 47/41* (2022.01)
*H04L 69/324* (2022.01)
*H04L 41/0226* (2022.01)
*H04L 1/00* (2006.01)

(52) U.S. Cl.
CPC ............ *H04L 47/41* (2013.01); *H04L 69/324* (2013.01); *H04L 2001/0093* (2013.01); *Y02D 30/50* (2020.08)

(56) References Cited

U.S. PATENT DOCUMENTS

| | | | |
|---|---|---|---|
| 6,094,439 A | 7/2000 | Krishna et al. | |
| 6,377,782 B1 | 4/2002 | Bishop et al. | |
| 7,024,469 B1 | 4/2006 | Chang et al. | |
| 7,983,272 B2 | 7/2011 | Carlson et al. | |
| 8,966,240 B2 | 2/2015 | Chopra | |
| 2003/0012223 A1 | 1/2003 | Chappell et al. | |
| 2003/0174675 A1 | 9/2003 | Willenegger et al. | |
| 2004/0057469 A1 | 3/2004 | Nuss et al. | |
| 2004/0100909 A1 | 5/2004 | Lee et al. | |
| 2004/0120349 A1 | 6/2004 | Border et al. | |
| 2004/0156330 A1 | 8/2004 | Yi et al. | |
| 2004/0184426 A1* | 9/2004 | Tan ...................... H04W 72/10 370/349 |
| 2004/0203987 A1 | 10/2004 | Butala | |
| 2006/0120282 A1 | 6/2006 | Carlson et al. | |
| 2007/0093263 A1 | 4/2007 | Song et al. | |
| 2007/0160082 A1 | 7/2007 | Un et al. | |
| 2008/0002739 A1 | 1/2008 | Droux et al. | |
| 2008/0019423 A1 | 1/2008 | Hu | |
| 2008/0138075 A1 | 6/2008 | Gustlin et al. | |
| 2008/0219251 A1 | 9/2008 | Xue et al. | |
| 2009/0276214 A1 | 11/2009 | Chong et al. | |
| 2010/0046367 A1 | 2/2010 | Vermani et al. | |
| 2010/0061345 A1 | 3/2010 | Wengerter et al. | |
| 2010/0297991 A1 | 11/2010 | Dahlman et al. | |
| 2011/0026511 A1 | 2/2011 | Jung et al. | |
| 2011/0075758 A1 | 3/2011 | Nam et al. | |
| 2011/0105107 A1* | 5/2011 | Kwon .................... H04W 76/20 455/422.1 |
| 2011/0289542 A1 | 11/2011 | Kitazato et al. | |
| 2012/0163308 A1 | 6/2012 | Ke et al. | |
| 2012/0171958 A1 | 7/2012 | Cornett et al. | |
| 2012/0236933 A1 | 9/2012 | Saitoh et al. | |
| 2012/0243489 A1 | 9/2012 | Pirskanen et al. | |
| 2012/0302240 A1 | 11/2012 | Tamaki et al. | |
| 2014/0010539 A1* | 1/2014 | Varanese .................. H04J 4/00 398/66 |
| 2014/0248054 A1 | 9/2014 | Wu | |
| 2015/0003315 A1 | 1/2015 | Chen et al. | |
| 2016/0029245 A1* | 1/2016 | Hong ................ H04W 28/0278 370/329 |
| 2016/0143078 A1* | 5/2016 | Jeong ................ H04W 28/0278 370/329 |
| 2016/0150440 A1* | 5/2016 | Lee ....................... H04W 24/10 455/422.1 |

FOREIGN PATENT DOCUMENTS

| | | |
|---|---|---|
| CN | 101018208 A | 8/2007 |
| CN | 101047695 A | 10/2007 |
| CN | 101707630 A | 5/2010 |
| CN | 101945440 A | 1/2011 |
| CN | 102036344 A | 4/2011 |
| CN | 102547592 A | 7/2012 |
| CN | 102655448 A | 9/2012 |
| CN | 102695103 A | 9/2012 |
| CN | 102726005 A | 10/2012 |
| CN | 103168484 A | 6/2013 |
| WO | 9845991 A1 | 10/1998 |
| WO | 0163856 A1 | 8/2001 |
| WO | WO-2014161168 A1 * | 10/2014 ........ H04W 72/1252 |

OTHER PUBLICATIONS

U.S. Appl. No. 15/068,518, filed Mar. 11, 2016.

\* cited by examiner

100

A transmit end device performs, at a physical layer, grouping processing on at least one piece of media access control MAC layer data that comes from a MAC layer, so as to determine at least one MAC layer data group — S110

Allocate, according to target bandwidth required by a target MAC layer data group and preset reference bandwidth of a logical channel, at least one target logical channel from N logical channels to the target MAC layer data group, so that the target logical channel corresponds to only the target MAC layer data group — S120

Perform encoding processing on the target MAC layer data group according to the target logical channel to generate target physical layer data, where the target logical channel corresponds to only the target physical layer data — S130

Send the target physical layer data and first indication information to a target receive end device of at least one receive end device, where the first indication information is used to indicate a mapping relationship between the target MAC layer data group and the target logical channel — S140

A receive end device receives, at a physical layer, target physical layer data and first indication information that are sent by a target transmit end device of at least one transmit end device  S210

Determine, from N logical channels according to the first indication information, at least one target logical channel that corresponds to only a target media access control MAC layer data group, where the first indication information is used to indicate a mapping relationship between the target MAC layer data group and the target logical channel, the target MAC layer data group is determined after the target transmit end device performs grouping processing on at least one piece of MAC layer data that comes from a MAC layer, and the target logical channel is allocated by the target transmit end device according to target bandwidth required by the target MAC layer data group and preset reference bandwidth of a logical channel  S220

Perform decoding processing on the target physical layer data according to the target logical channel to acquire the target MAC layer data group 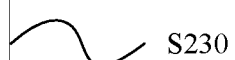 S230

FIG. 9

DATA TRANSMISSION METHOD AND APPARATUS

CROSS-REFERENCE TO RELATED APPLICATIONS

This application is a continuation of U.S. patent application Ser. No. 15/068,518, filed on Mar. 11, 2016, (Now U.S. Pat. No. 10,511,460), which is a continuation of International Patent Application No. PCT/CN2013/083494, filed on Sep. 13, 2013. All of the aforementioned patent applications are hereby incorporated by reference in their entireties.

TECHNICAL FIELD

Embodiments of the present disclosure relate to the communications field, and in particular to a data transmission method and apparatus.

BACKGROUND

With the development and progress of technologies, an Ethernet transfer rate has increased from 10 M (Megabit), 100 M, 1 G (Gigabit), 10 G to the current 40 G and 100 G. In addition, 40 G Ethernet and 100 G Ethernet have been widely applied. Therefore, a situation occurs in which a plurality of rates coexist. Ethernet interfaces of a plurality of rate levels cannot be interconnected. For example, in the prior art, 10 G, 40 G and 100 G Ethernet interfaces cannot be interconnected and a higher rate is not backward compatible. There are many types of device boards and a large number of spare parts and different boards need to be designed for different rates, thereby causing high maintenance costs.

Therefore, with a requirement for diversified Ethernet rates, designing of a flexible Ethernet physical layer implementation method needs to be taken into consideration to meet a requirement for an Ethernet network with diversified rate levels.

SUMMARY

Embodiments of the present disclosure provide a data transmission method, which can meet a requirement for an Ethernet network with diversified rate levels.

According to a first aspect, a method for data transmission is provided, where the method includes: grouping, at a physical layer by a transmit end device, media access control (MAC) layer data into a plurality of MAC layer data groups; allocating, according to a bandwidth required by a target MAC layer data group and a reference bandwidth of a logical channel, at least one target logical channel from N logical channels to the target MAC layer data group, wherein the target logical channel corresponds to the target MAC layer data group; encoding the target MAC layer data group to generate target physical layer data, where the target logical channel corresponds to the target physical layer data; and sending the target physical layer data and first indication information to a target receive end device of a plurality of receive end devices, where the first indication information is used to indicate a relationship between the target MAC layer data group and the target logical channel.

According to a second aspect, a method for data transmission is provided, where the method includes: receiving, at a physical layer by a receive end device, target physical layer data and first indication information that are sent by a target transmit end device of a plurality of transmit end devices; determining, from N logical channels according to the first indication information, at least one target logical channel that corresponds to a target media access control (MAC) layer data group, where the first indication information is used to indicate a relationship between the target MAC layer data group and the target logical channel; and decoding the target physical layer data to acquire the target MAC layer data group.

According to a third aspect, an apparatus for data transmission is provided, where the apparatus includes: a processor; and a computer readable medium having a plurality of computer executable instructions that, when executed by the processor, cause the processor to perform the following steps: grouping, at a physical layer, media access control (MAC) layer data into a plurality of MAC layer data groups; allocating, according to a bandwidth required by a target MAC layer data group and a reference bandwidth of a logical channel, at least one target logical channel from N logical channels to the target MAC layer data group, wherein the target logical channel corresponds to the target MAC layer data group; encoding the target MAC layer data group to generate target physical layer data, where the target logical channel corresponds to the target physical layer data; sending the target physical layer data to a target receive end device of a plurality of receive end devices, and sending first indication information to the target receive end device, where the first indication information is used to indicate a relationship between the target physical layer data and the target logical channel.

According to a fourth aspect, an apparatus for data transmission is provided, where the apparatus includes: a processor; and a computer readable medium having a plurality of computer executable instructions that, when executed by the processor, cause the processor to perform the following steps: receiving, at a physical layer, target physical layer data sent by a target transmit end device of a plurality of transmit end devices, and receiving first indication information sent by the target transmit end device, where the first indication information is used to indicate at least one target logical channel in N logical channels that corresponds to the target physical layer data; determining, according to the first indication information, the target logical channel that corresponds to the target physical layer data; and decoding the target physical layer data to acquire a target media access control (MAC) layer data group.

In the data transmission method and apparatus according to the embodiments of the present disclosure, grouping is performed on MAC layer data and a logical channel is allocated to each MAC layer data group according to a rate of each MAC layer data group, to perform encoding processing and transmission processing on each MAC layer data group according to the allocated logical channel, which can meet a requirement for an Ethernet network with diversified rate levels and flexibly respond to a transmission rate requirement.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a schematic flowchart of a data transmission method according to an embodiment of the present disclosure;

FIG. 9 is a schematic flowchart of a data transmission method according to another embodiment of the present disclosure;

DESCRIPTION OF EMBODIMENTS

The technical solutions of the present disclosure may be applied to, for example, an Ethernet communications system.

FIG. 1 is a schematic flowchart of a data transmission method 100 according to an embodiment of the present disclosure from a perspective of a transmit end device. As shown in FIG. 1, the method 100 includes:

S110: A transmit end device performs, at a physical layer, grouping processing on at least one piece of media access control (MAC) layer data that comes from a MAC layer, to determine at least one MAC layer data group.

S120: Allocate, according to target bandwidth required by a target MAC layer data group and preset reference bandwidth of a logical channel, at least one target logical channel from N logical channels to the target MAC layer data group, so that the target logical channel corresponds to only the target MAC layer data group.

S130: Perform encoding processing on the target MAC layer data group according to the target logical channel to generate target physical layer data, where the target logical channel corresponds to only the target physical layer data.

S140: Send the target physical layer data and first indication information to a target receive end device of at least one receive end device, where the first indication information is used to indicate a mapping relationship between the target MAC layer data group and the target logical channel.

Specifically, the data transmission method 100 according to this embodiment of the present disclosure is mainly completed at the physical layer of the transmit end device. That is, when the physical layer receives a plurality of MAC layer data frames that comes from the MAC layer, the foregoing method 100 is executed to convert MAC layer data into physical layer data that complies with a format of data transmitted between Ethernet devices and to transmit the physical layer data.

First, a physical layer structure of an Ethernet device (for example, the transmit end device) according to this embodiment of the present disclosure is described.

Optionally, in this embodiment of the present disclosure, the physical layer includes a reconciliation sublayer and a physical coding sublayer. The reconciliation sublayer is used to perform conversion processing on data between a MAC layer and the physical layer. The physical coding sublayer which includes N logical channels is used to implement encoding processing on physical layer data.

In addition, the physical layer further includes a media independent interface. The media independent interface is arranged between the reconciliation sublayer and the physical coding sublayer and used for data transmission between the reconciliation sublayer and the physical coding sublayer by using N timeslots, where one timeslot is used to transmit data in one logical channel.

Figure 2:
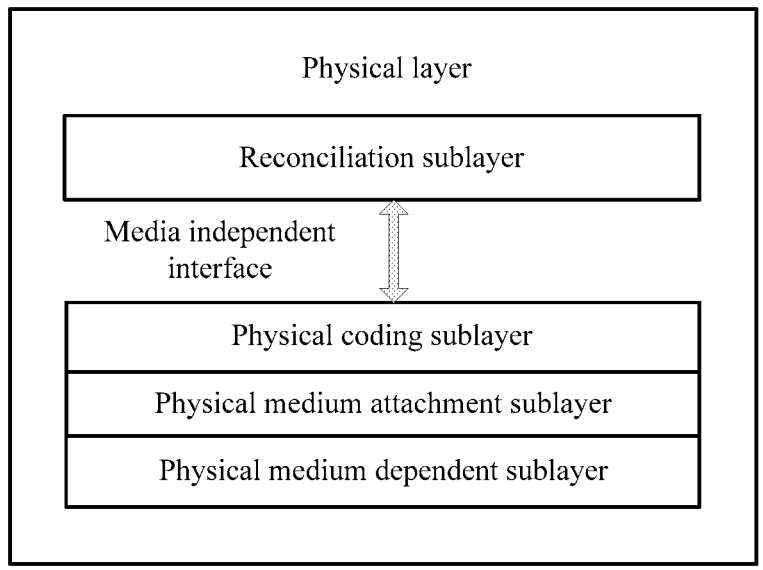
FIG. 2 is a schematic structural diagram of a physical layer structure according to an embodiment of the present disclosure.

FIG. 2 is a schematic diagram of a physical layer structure according to an embodiment of the present disclosure. As shown in FIG. 2, in this embodiment of the present disclosure, a physical layer of an Ethernet device may include: a reconciliation sublayer (RS), a physical coding sublayer (PCS), a media independent interface (MII), a physical medium attachment (PMA) sublayer, and a physical medium dependent (PMD) sublayer. The reconciliation sublayer is used to perform reconciliation processing, convert an Ethernet frame (also known as a MAC layer data frame) into media independent interface data (an example of MAC layer data), and send the media independent interface data to the physical coding sublayer through the media independent interface. The physical coding sublayer performs encoding processing (for example, 64B/66B encoding), scrambling processing, and the like on the media independent interface data to generate a (for example, 66B) code block (an example of physical layer data), and delivers the code block to a logical channel. The physical medium attachment sublayer is used to implement multiplexing from a logical channel to a physical channel. The physical medium dependent sublayer is used to transmit the physical layer data through a physical channel.

It should be understood that the foregoing physical layer structure is described merely as an example, and the present disclosure is not limited thereto. All other physical layer structures that can implement the data transmission method 100 of the embodiment of the present disclosure shall fall within the scope of the present disclosure.

For ease of understanding, the following describes in detail a process of applying the data transmission method 100 of the embodiment of the present disclosure to a physical layer with the foregoing structure.

Figure 3:
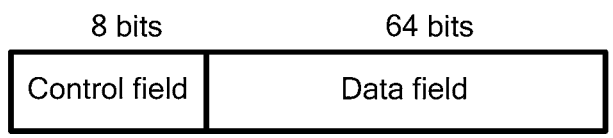
FIG. 3 is a schematic diagram of a data format of media independent interface data according to an embodiment of the present disclosure.

In S110, at the reconciliation sublayer, an Ethernet frame from the MAC layer may be converted into data (that is, MAC layer data) that complies with physical layer data transmission, where the MAC layer data may include 8 bits of control information and 64 bits of data. FIG. 3 is a schematic diagram of a data format of media independent interface data (that is, MAC layer data) according to an embodiment of the present disclosure. As shown in FIG. 3, MAC layer data may include a control field and a data field. The control field is used to carry 8 bits of control information and the data field is used to carry 64 bits of data.

In addition, at the reconciliation sublayer, grouping processing may be performed on MAC layer data. As a grouping method, for example, MAC layer data may be divided by destination address, and MAC layer data with a same destination address is added to a same group.

It should be understood that the foregoing grouping method is described merely as an example, and the present disclosure is not limited thereto. Any grouping method may be used according to a network requirement or a customer requirement. For example, upper-layer data may be grouped (for example, by data type) at an upper layer (a layer above the MAC layer) in advance, and an Ethernet frame generated according to the grouped upper-layer data are sent to the physical layer in different time segments that are preset. Therefore, at the physical layer, MAC layer data converted from the Ethernet frame received within a same time segment may be added to a same group; or grouping may be performed according to a rule preset by an administrator or a group identifier added to the Ethernet frame (the group identifier indicates a group to which MAC layer data converted from the Ethernet frame belongs). In this case, the group identifier may be added at the MAC layer or an upper layer (a layer above the MAC layer) according to, for example, a service to which the data belongs.

It should be noted that the foregoing describes a process of grouping MAC layer data after the MAC layer data is converted from the Ethernet frame, but the present disclosure is not limited thereto. The Ethernet frame may also be grouped first, and then format conversion processing is performed on the Ethernet frame by taking a group as a unit to directly obtain MAC layer data groups.

After that, at the reconciliation sublayer, bandwidth (target bandwidth) required by each MAC layer data group may be determined. As a determining method, for example, the target bandwidth of each MAC layer data group may be determined according to a transmission rate of the MAC layer data group (that is, an amount of data of the MAC layer data group, which is received or sent within a unit time).

It should be understood that the foregoing bandwidth determining method is described merely as an example, and the present disclosure is not limited thereto. For example, the target bandwidth of each MAC layer data group may also be determined according to a bandwidth identifier added to an Ethernet frame (the bandwidth identifier indicates bandwidth required by MAC layer data converted from the Ethernet frame). In this case, the bandwidth identifier may be added at an upper layer (a layer above the MAC layer) according to, for example, a maximum bandwidth requirement of the data.

In S120, a logical channel may be allocated to each MAC layer data group. In this embodiment of the present disclosure, this process may be implemented at the reconciliation sublayer (that is, case 1), or may be implemented at the physical coding sublayer (that is, case 2). The following describes the foregoing two cases separately.

Case 1

Optionally, the allocating, according to target bandwidth required by a target MAC layer data group and preset reference bandwidth of a logical channel, at least one target logical channel to the target MAC layer data group, includes:

determining, at the reconciliation sublayer, the target logical channel according to the target bandwidth and the reference bandwidth, and sending second indication information to the physical coding sublayer, where the second indication information is used to indicate the target logical channel; and the performing encoding processing on the target MAC layer data group according to the target logical channel includes:

determining, at the physical coding sublayer, the target logical channel according to the second indication information, and performing encoding processing on the target MAC layer data group according to the target logical channel.

For ease of understanding, as an example rather than a limitation, it is assumed that the transmit end device in this embodiment of the present disclosure has the following parameters: an Ethernet physical interface with total bandwidth of 400 G is constructed, bandwidth of a logical channel of the physical coding sublayer (or reference bandwidth of a logical channel) is 25 G, and therefore the physical coding sublayer includes 16 logical channels (that is, N=16).

It is assumed that three MAC layer data groups, namely, a MAC layer data group A (an example of the target MAC layer data group), a MAC layer data group B (another example of the target MAC layer data group), and a MAC layer data group Z (still another example of the target MAC layer data group), are obtained after the foregoing grouping processing.

It is assumed that a traffic bandwidth requirement (target bandwidth) of the MAC layer data group A is 50 G, a traffic bandwidth requirement (target bandwidth) of the MAC layer data group B is 25 G, and a traffic bandwidth requirement (target bandwidth) of the MAC layer data group Z is 50 G.

Therefore, at the reconciliation sublayer, it may be determined that the MAC layer data group A corresponds to two logical channels (for example, a first logical channel and a second logical channel, which are referred to hereinafter as a logical channel 1 and a logical channel 2), the MAC layer data group B corresponds to one logical channel (for example, a third logical channel, which is referred to hereinafter as a logical channel 3), and the MAC layer data group Z corresponds to two logical channels (for example, a fifteenth logical channel and a sixteenth logical channel, which are referred to hereinafter as a logical channel 15 and a logical channel 16).

After that, the reconciliation sublayer may send information (an example of the second indication information) indicating a logical channel corresponding to each piece of MAC layer data to the physical coding sublayer.

Optionally, the method further includes:

sending, at the reconciliation sublayer, third indication information to the physical coding sublayer, where the third indication information is used to indicate the mapping relationship between the target MAC layer data group and the target logical channel.

In the foregoing case in which three MAC layer data groups are obtained, the reconciliation sublayer may send, to the physical coding sublayer, information (an example of the third indication information) used to indicate a MAC layer data group corresponding to each logical channel of the physical coding sublayer.

Optionally, the physical layer further includes a media independent interface. The media independent interface is arranged between the reconciliation sublayer and the physical coding sublayer and used for data transmission between the reconciliation sublayer and the physical coding sublayer by using N timeslots, where one timeslot is used to transmit data in one logical channel.

In this embodiment of the present disclosure, data between the reconciliation sublayer and the physical coding sublayer is transmitted through the media independent interface. The media independent interface may use a time division multiplexing data transmission manner, that is, one period may be divided into N timeslots and the N timeslots correspond to N logical channels of the physical coding sublayer, that is, the media independent interface may transmit MAC layer data corresponding to only one logical channel in one timeslot. For example, for the MAC layer data group A, after conversion by the MAC layer data group A, the first 8 bits of control information and 64 bits of data are placed in the first timeslot, the second 8 bits of control information and 64 bits of data are placed in the second timeslot, the third 8 bits of control information and 64 bits of data are placed in the first timeslot, the fourth 8 bits of control information and 64 bits of data are placed in the second timeslot, and so on. Likewise, for the MAC layer data group Z, after conversion by the MAC layer data group Z, the first 8 bits of control information and 64 bits of data are placed in the fifteenth timeslot, the second 8 bits of control information and 64 bits of data are placed in the sixteenth timeslot, the third 8 bits of control information and 64 bits of data are placed in the fifteenth timeslot, the fourth 8 bits of control information and 64 bits of data are placed in the sixteenth timeslot, and so on.

Figure 4:
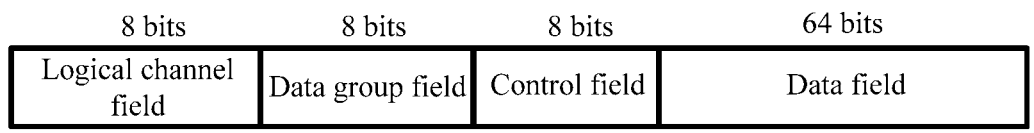
FIG. 4 is a schematic diagram of a data format of media independent interface data according to another embodiment of the present disclosure.

Therefore, as a method for transmitting the foregoing second indication information and third indication information, the second indication information and the third indication information may be included in MAC layer data and transmitted to the physical coding sublayer at a same time. FIG. 4 is a schematic diagram of a data format of media independent interface data (that is, MAC layer data) according to another embodiment of the present disclosure. As shown in FIG. 4, a logical channel field and a data group field may be added to a data format of MAC layer data. The logical channel field is used to carry second indication information indicating a logical channel corresponding to MAC layer data of a timeslot. The data group field is used to carry third indication information indicating a MAC layer data group to which the MAC layer data of the timeslot belongs. In the foregoing example, for the MAC layer data group A, a logical channel field of the MAC layer data group A carries information indicating the first and second logical channels, and a data group field of the MAC layer data group A carries information indicating the data group A; for the MAC layer data group B, a logical channel field of the MAC layer data group B carries information indicating the third logical channel, and a data group field of the MAC layer data group B carries information indicating the data group B; and for the MAC layer data group Z, a logical channel field of the MAC layer data group Z carries information indicating the fifteenth and sixteenth logical channels, and a data group field of the MAC layer data group Z carries information indicating the data group Z. In addition, a sequence of the logical channel field and the data group field is not limited to that shown in FIG. 4 as long as the logical channel field and the data group field are carried in the data format of MAC layer data.

It should be understood that the foregoing method for transmitting the second indication information and third indication information is described merely as an example, and the present disclosure is not limited thereto. The second indication information, the third indication information, and the MAC layer data may also be sent separately in different time segments; or a transmission rule may be specified in advance so that timeslots of the media independent interface correspond to logical channels of the physical coding sublayer one to one, so that the reconciliation sublayer may select time for transmission according to a mapping relationship between the timeslots and the logical channels, and therefore the physical coding sublayer may determine, according to a timeslot for receiving MAC layer data, a logical channel corresponding to the MAC layer data. Therefore, the foregoing logical channel field may be omitted.

Therefore, the physical coding sublayer may determine, according to the second indication information, MAC layer data (MAC layer data received in a same timeslot) corresponding to each logical channel, and may determine, according to the third indication information, one or more logical channels corresponding to each MAC layer data group.

It should be noted that, if only one MAC layer data group exists, the foregoing data group field may be omitted, and the physical coding sublayer considers by default that the logical channels correspond to only one same MAC layer data group. In addition, in this case, if target bandwidth of the MAC layer data group is less (less than or equal to reference bandwidth of a logical channel), the MAC layer data group corresponds to only one logical channel. Therefore, the foregoing logical channel field may be omitted, and the physical coding sublayer may randomly allocate a logical channel to the MAC layer data group.

Case 2

The allocating, according to target bandwidth required by a target MAC layer data group and preset reference bandwidth of a logical channel, at least one target logical channel to the target MAC layer data group, includes:

determining, at the reconciliation sublayer according to the target bandwidth and the reference bandwidth, the number of target logical channels and the number of target timeslots on the media independent interface which are used to transmit the target MAC layer data group;

sending, on the media independent interface, the target MAC layer data group to the physical coding sublayer by using the target timeslots; and allocating, at the physical coding sublayer, a logical channel to the target MAC layer data group as the target logical channel according to the number of the target timeslots.

Specifically, in the application scenario shown in the foregoing case 1 (that is, total bandwidth is 400 G; reference bandwidth of a logical channel is 25 G; the physical coding sublayer includes 16 logical channels; three MAC layer data groups are obtained; a traffic bandwidth requirement of a MAC layer data group A is 50 G; a traffic bandwidth requirement of a MAC layer data group B is 25 G; and it is assumed that a traffic bandwidth requirement of a MAC layer data group Z is 50 G), it may be determined at the reconciliation sublayer that the MAC layer data group A corresponds to two logical channels, the MAC layer data group B corresponds to one logical channel, and the MAC layer data group Z corresponds to two logical channels.

Optionally, the method further includes:

sending, at the reconciliation sublayer, third indication information to the physical coding sublayer, where the third indication information is used to indicate the mapping relationship between the target MAC layer data group and the target logical channel.

In the foregoing case in which three MAC layer data groups are obtained, the reconciliation sublayer may send, to the physical coding sublayer, information (an example of the third indication information) used to indicate a MAC layer data group corresponding to each logical channel of the physical coding sublayer.

Optionally, the physical layer further includes a media independent interface. The media independent interface is arranged between the reconciliation sublayer and the physical coding sublayer and used for data transmission between the reconciliation sublayer and the physical coding sublayer by using N timeslots, where one timeslot is used to transmit data in one logical channel.

In this embodiment of the present disclosure, data between the reconciliation sublayer and the physical coding sublayer is transmitted through the media independent interface. The media independent interface may use a periodic data transmission manner, that is, one period may be divided into N timeslots and the N timeslots correspond to N logical channels of the physical coding sublayer, in other words, in one timeslot, the media independent interface may transmit MAC layer data corresponding to only one logical channel. For example, for the MAC layer data group A, after conversion by the MAC layer data group A, the first 8 bits of control information and 64 bits of data are placed in the first timeslot, the second 8 bits of control information and 64 bits of data are placed in the second timeslot, the third 8 bits of control information and 64 bits of data are placed in the first timeslot, the fourth 8 bits of control information and 64 bits of data are placed in the second timeslot, and so on. Likewise, for the MAC layer data group Z, after conversion by the MAC layer data group Z, the first 8 bits of control information and 64 bits of data are placed in the fifteenth timeslot, the second 8 bits of control information and 64 bits of data are placed in the sixteenth timeslot, the third 8 bits of control information and 64 bits of data are placed in the fifteenth timeslot, the fourth 8 bits of control information and 64 bits of data are placed in the sixteenth timeslot, and so on.

Therefore, as a method for transmitting the foregoing third indication information, the third indication information may be included in MAC layer data and transmitted to the physical coding sublayer. FIG. 4 is a schematic diagram of a data format of media independent interface data (that is, MAC layer data) according to another embodiment of the present disclosure. As shown in FIG. 4, a data group field may be added to a data format of MAC layer data. The data group field is used to carry third indication information indicating a MAC layer data group to which MAC layer data of a timeslot belongs. A target logical channel corresponding to each MAC layer data group is not determined at the RS layer, and therefore, a "logical channel field" shown in FIG. 4 is not required in this embodiment, that is, the data format of media independent interface data (that is, MAC layer data) in this embodiment may include only the data group field, a control field, and a data field that are shown in FIG. 4.

Therefore, the physical coding sublayer may allocate, according to a timeslot for receiving each piece of MAC layer data, one same logical channel to MAC layer data received in a same timeslot, and therefore may determine, according to the third indication information, one or more logical channels corresponding to each MAC layer data group.

It should be understood that the foregoing method for transmitting the third indication information is described merely as an example, and the present disclosure is not limited thereto. For example, the third indication information and the MAC layer data may be sent separately in different time segments. For another example, if only one MAC layer data group exists, the foregoing data group field may be omitted, and the physical coding sublayer considers by default that the logical channels correspond to only one same MAC layer data group. In addition, in this case, if target bandwidth of the MAC layer data group is less (less than or equal to reference bandwidth of a logical channel), the MAC layer data group corresponds to only one logical channel. Therefore, the foregoing logical channel field may be omitted, and the physical coding sublayer may randomly allocate a logical channel to the MAC layer data group.

In S130, after MAC layer data corresponding to each logical channel is determined, at the physical coding sublayer, encoding processing may be performed on data (a stream of 8+64 bits information) of each logical channel. For the encoding processing, the following method may be used as an example:

First, 64B/66B encoding may be performed on the stream of 8+64 bits information (information in a control field and a data field) to form a 66B code block stream.

After that, forward error correction (FEC) processing may be performed on the 66B code block stream; or encoding and compression processing may be performed again on 66B code blocks selectively, for example, every four 66B code blocks are encoded and converted into one 257B code block, and then FEC processing is performed on a 257B code block stream.

Finally, scrambling processing may be performed on a code block stream into which FEC check information is added. For a 66B code block, a 2-bit synchronization header may not be involved in the scrambling processing.

In this embodiment of the present disclosure, processes and methods of 64B/66B encoding processing, FEC processing, and scrambling processing may be the same as those in the prior art, and are not described herein to avoid repetition.

Optionally, the performing encoding processing on the target MAC layer data group according to the target logical channel to generate target physical layer data is:

performing encoding processing on the target MAC layer data group by taking the target logical channel as a unit to generate the target physical layer data; or taking the at least one target logical channel corresponding to the target MAC layer data group as one group, and performing encoding processing on the target MAC layer data group by taking a group as a unit, to generate the target physical layer data.

Figure 5:
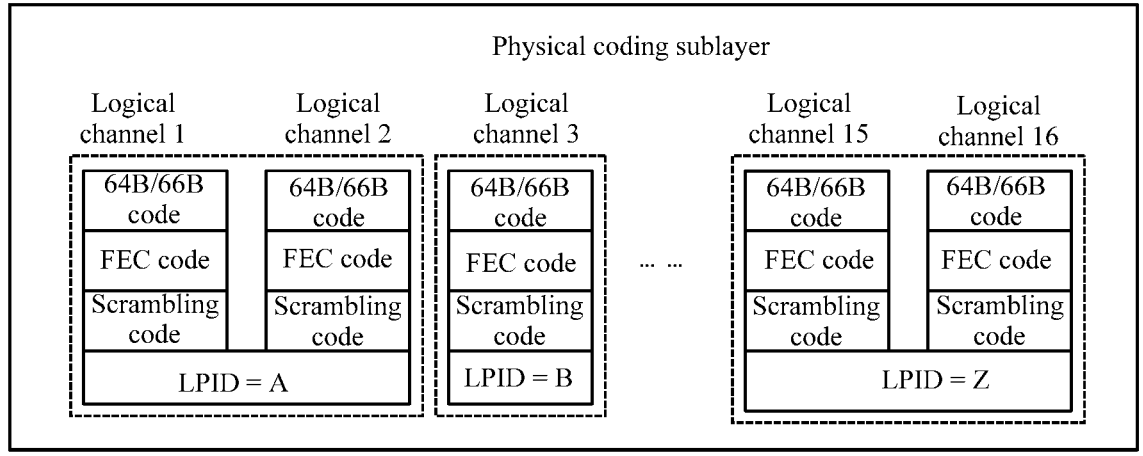
FIG. 5 is a schematic diagram of a MAC layer data group processing manner according to an embodiment of the present disclosure.

As shown in FIG. 5, 64B/66B encoding processing, FEC processing, and scrambling processing may be performed on the MAC layer data by taking a logical channel as a unit. In this case, it needs to be ensured that processing of logical channels corresponding to a same MAC layer data group is synchronized.

Figure 6:
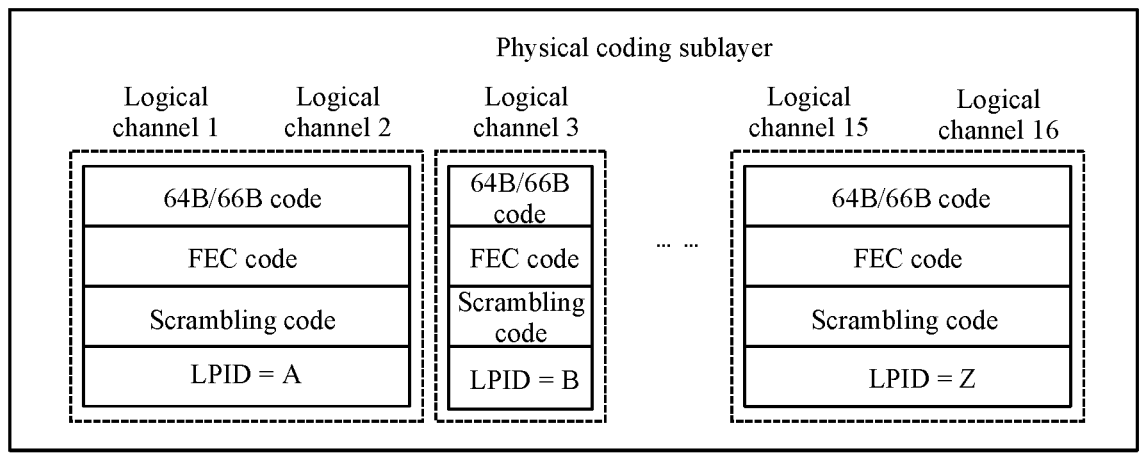
FIG. 6 is a schematic diagram of a MAC layer data group processing manner according to another embodiment of the present disclosure.

Alternatively, as shown in FIG. 6, overall 64B/66B encoding processing, FEC processing, and scrambling processing may be performed on code block streams of logical channels corresponding to a same MAC layer data group by taking a MAC layer data group as a unit.

Performing encoding, FEC processing, and scrambling processing by taking a logical channel or a MAC data group as a unit can implement multi-channel processing and lower complexity of transmitting a high-rate service, thereby reducing hardware costs.

After that, an alignment marker (AM) may be inserted by taking a logical channel or a MAC layer data group as a unit. In this embodiment of the present disclosure, the AM is inserted based on a certain period, where the period is 16384 code blocks on each logical channel. Respective alignment markers are periodically inserted on logical channels, or respective alignment markers are inserted on logical channels within a MAC layer data group at a same time and the insertion is performed periodically on MAC layer data groups. In addition, the AM is a special pattern. Alignment marker AM patterns inserted on logical channels are different and used for a receive end to differentiate the logical channels. A logical channel number can be identified by using a pattern of an alignment marker code block.

Therefore, data (physical layer data) that complies with physical layer data transmission is generated. That is, by means of the foregoing process, physical layer data A corresponding to the foregoing MAC layer data group A, physical layer data B corresponding to the foregoing MAC layer data group B, and physical layer data C corresponding to the foregoing MAC layer data group C are generated.

The method further includes:

sending the first indication information to the target receive end device, where the first indication information is used to indicate the mapping relationship between the target MAC layer data group and the target logical channel.

In addition, the first indication information and the target physical layer data are carried in a same data packet; or the first indication information is sent independent of the target physical layer data.

Specifically, as described above, if a plurality of MAC layer data groups (the MAC layer data group A, the MAC layer data group B, and the MAC layer data group Z) is acquired, the transmit end device further needs to notify (by the first indication information) a receive end of a MAC layer data group corresponding to each logical channel.

As a method for sending the foregoing first indication information, logical port identifier (LPID) information may be added to the foregoing added AM. LPID information added to logical channels corresponding to a same MAC layer data group is consistent, and LPID information added to logical channels corresponding to different MAC layer data groups varies. Therefore, the receive end device can differentiate a MAC layer data group corresponding to each logical channel by identifying LPID information of the logical channel. Specifically, a 66B alignment marker code block is used as an example. The following Table 1 shows a 66B alignment marker according to an embodiment of the present disclosure.

It should be understood that the foregoing method for transmitting the first indication information is described merely as an example, and the present disclosure is not limited thereto. For example, the first indication information and the AM may be sent separately in different time segments. For another example, if only one MAC layer data group exists, the foregoing LPID2 field and LPID6 field may be omitted, and the receive end considers by default that the logical channels correspond to only one same MAC layer data group.

In the data transmission method according to this embodiment of the present disclosure, a transmit end device sends to a receive end device information indicating physical layer data (or each MAC layer data group) corresponding to each logical channel, which can enable a receive end device to easily determine logical channels corresponding to a same MAC layer data group.

In S140, the physical medium attachment sublayer may multiplex to one or more physical channels the foregoing determined data corresponding to each logical channel. For example, different MAC layer data groups (or physical layer data) may be multiplexed to different physical channels. In addition, according to a bandwidth requirement of a MAC layer data group, one MAC layer data group may correspond to one or more physical channels.

For example, it is assumed that the transmit end device has a total of four physical channels and each channel has bandwidth of 100 G For the MAC layer data group A whose bandwidth is 50 G, the logical channel 1 and the logical channel 2 corresponding to the MAC layer data group A may be multiplexed to one physical channel (for example, a physical channel 1). For the MAC layer data group B whose bandwidth is 25 G, the logical channel 3 corresponding to the MAC layer data group B may be multiplexed to one physical channel (for example, a physical channel 2). For the MAC layer data group Z whose bandwidth is 50 G, the logical channel 15 and the logical channel 16 corresponding to the MAC layer data group Z may be multiplexed to one physical channel (for example, a physical channel 3). In addition, in this embodiment of the present disclosure, a multiplexing manner may be bit multiplexing.

It should be noted that, in this embodiment of the present disclosure, to easily implement multiplexing from a logical channel to a physical channel, the number of logical channels may be an integer multiple of the number of physical

TABLE 1

|      | Synchronization Header | M0   | M1   | LPID2 | BIP3 | M4   | M5   | LPID6 | BIP7  |
|------|------------------------|------|------|-------|------|------|------|-------|-------|
| AM1  | 10                     | 0xc1 | 0x68 | #A    | BIP3 | 0x3e | 0x97 | ~#A   | ~BIP3 |
| AM2  | 10                     | 0x9d | 0x71 | #A    | BIP3 | 0x62 | 0x8e | ~#A   | ~BIP3 |
| AM3  | 10                     | 0x59 | 0x4b | #B    | BIP3 | 0xa6 | 0xb4 | ~#B   | ~BIP3 |
| AM15 | 10                     | 0x83 | 0xc7 | #Z    | BIP3 | 0x7c | 0x38 | ~#Z   | ~BIP3 |
| AM16 | 10                     | 0x35 | 0x36 | #Z    | BIP3 | 0xca | 0xc9 | ~#Z   | ~BIP3 |

As shown in Table 1, in this embodiment of the present disclosure, one AM may have 66 bits. Block synchronization header information 10 is placed in the first two bits, and the foregoing first indication information is placed in the LPID2 field and the LPID6 field. In addition, information obtained by reversing bits in the LPID2 field is placed in the LPID6 field. Check information of the logical channel is placed in the BIP3 field and the BIP7 field. Alignment pattern information of a logical channel is placed in the M0 field, M1 field, M4 field and M5 field.

channels, or reference bandwidth of a physical channel may be an integer multiple of reference bandwidth of a logical channel. In addition, by setting reference bandwidth of a physical channel to reference bandwidth of a logical channel, transmission on a same group of logical channels may be implemented by using a same physical channel.

At the physical medium dependent sublayer, for example, a multi-carrier manner may be used to transmit to the receive end device the foregoing physical layer data that is multiplexed to each physical channel.

Optionally, the sending the target physical layer data to a target receive end device of at least one receive end device includes:

determining a target logical port from at least one logical port, where one logical port corresponds to at least one physical channel; and sending the target physical layer data to the target receive end device through a physical channel corresponding to the target logical port.

In this embodiment of the present disclosure, one or more logical ports may be configured at the physical layer (for example, the physical medium dependent sublayer), where one logical port may include one or more physical channels and physical channels included in different logical ports are different. Herein, the numbers of physical channels included in different logical ports may be the same or may be different, and the present disclosure poses no particular limitation thereon. It should be understood that the foregoing logical port dividing method is described merely as an example, and the present disclosure is not limited thereto. For example, logical ports may also be configured based on the foregoing determined MAC layer data groups, so that one logical port corresponds to one MAC layer data group, or one logical port corresponds to a plurality of logical channels corresponding to a same MAC layer data group. In addition, a plurality of logical channels corresponding to a same logical port is multiplexed to at least one physical channel that belongs to the logical port.

Optionally, in this embodiment of the present disclosure, the transmit end device may connect to only one receive end device.

In this case, when selecting a logical port used to send physical layer data, the transmit end device may select, according to a rate requirement of the physical layer data (or target bandwidth of a corresponding MAC layer data group), reference bandwidth of each physical channel, and the number of physical channels included in each logical port, one logical port to perform the sending. For example, if the rate requirement of the physical layer data is 75 G and bandwidth of one physical channel is 25 G, a logical port including three physical channels may be selected to send the physical layer data.

Optionally, in this embodiment of the present disclosure, the transmit end device is communicatively connected to at least two receive end devices, and the transmit end device includes at least two logical ports, where one logical port corresponds to one receive end device.

The transmit end device may include a plurality of physical channels in a plurality of logical ports, and one logical port may correspond to only one receive end device, that is, the logical port is only used to transmit data that needs to be sent to the receive end device. It should be noted that, in this embodiment of the present disclosure, for one receive end device, there may be a plurality of corresponding logical interfaces or there may be only one corresponding logical interface, and the present disclosure poses no particular limitation thereon.

Optionally, the determining, from at least one logical port, a target logical port that is used to transmit the target physical layer data includes:

determining, from a preset mapping relationship between the at least two receive end devices and the at least two logical ports, the target logical port according to the target receive end device.

Figure 7:
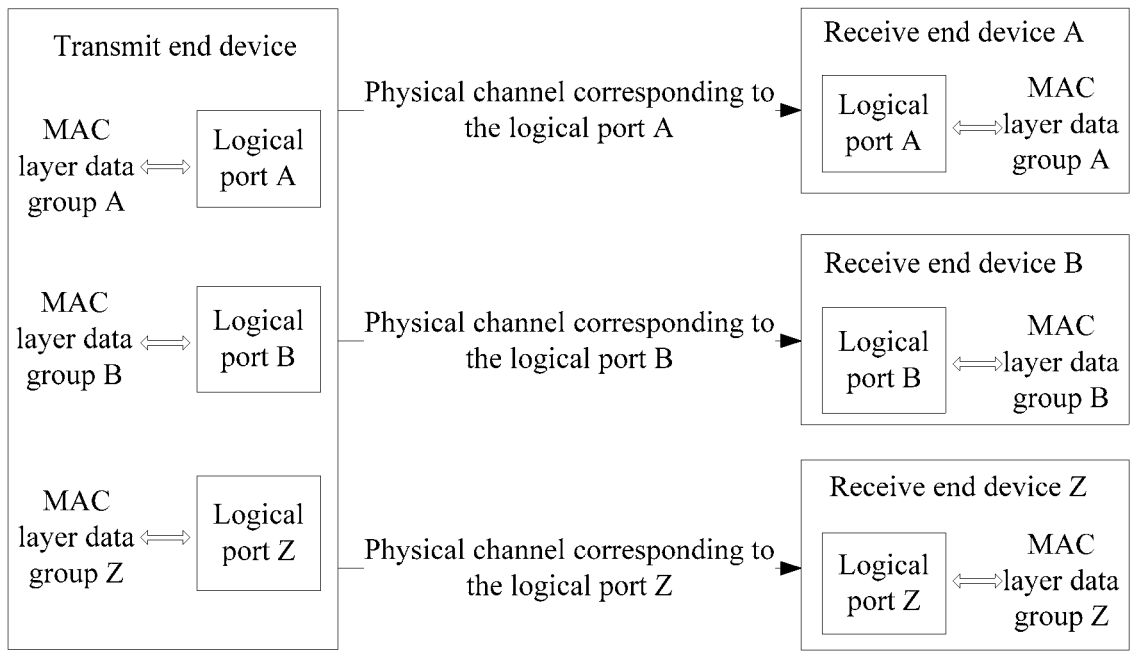
FIG. 7 is a schematic diagram of a logical port connection manner according to an embodiment of the present disclosure.

In this case, when selecting a logical port used to send physical layer data, the transmit end device may determine a logical port according to the mapping relationship between the logical ports and the receive end devices. As shown in FIG. 7, physical layer data A (an example of target physical layer data) generated by a MAC layer data group A needs to be sent to a receive end device A; and then, a logical port A (an example of the target logical port) corresponding to the receive end device A may be selected and a physical channel corresponding to the logical port A is used to perform the sending. Physical layer data B (another example of the target physical layer data) generated by a MAC layer data group B needs to be sent to a receive end device B; and then, a logical port B (another example of the target logical port) corresponding to the receive end device B may be selected and a physical channel corresponding to the logical port B is used to perform the sending. Physical layer data Z (still another example of the target physical layer data) generated by a MAC layer data group Z needs to be sent to a receive end device Z; and then, a logical port Z (still another example of the target logical port) corresponding to the receive end device Z may be selected and a physical channel corresponding to the logical port Z is used to perform the sending.

It should be noted that bandwidth of each logical port (or the number of physical channels included in each logical port) may be pre-determined according to a transmission rate supported by each receive end device, and a rate requirement (target bandwidth) of data that needs to be sent to a receive end device needs to be lower than the transmission rate supported by each receive end device, thereby ensuring that bandwidth of a selected logical port is greater than or equal to the rate requirement of the data that needs to be transmitted.

In addition, in this embodiment of the present disclosure, for example, in a case in which MAC layer data groups are divided according to MAC layer addresses carried in MAC layer data, the transmit end device may search a prestored mapping relationship between MAC layer addresses and the receive end devices, for example, a forwarding table, according to a destination MAC layer address of a MAC layer data group, to determine a receive end device to which each MAC layer data group (or target physical layer data generated after encoding processing is performed on the MAC layer data group) needs to be sent. It should be understood that the foregoing method for determining a receive end device of each MAC layer data group is described merely as an example and all other methods that can determine a receive end device of one piece of physical layer data fall within the protection scope of the present disclosure.

Figure 8:
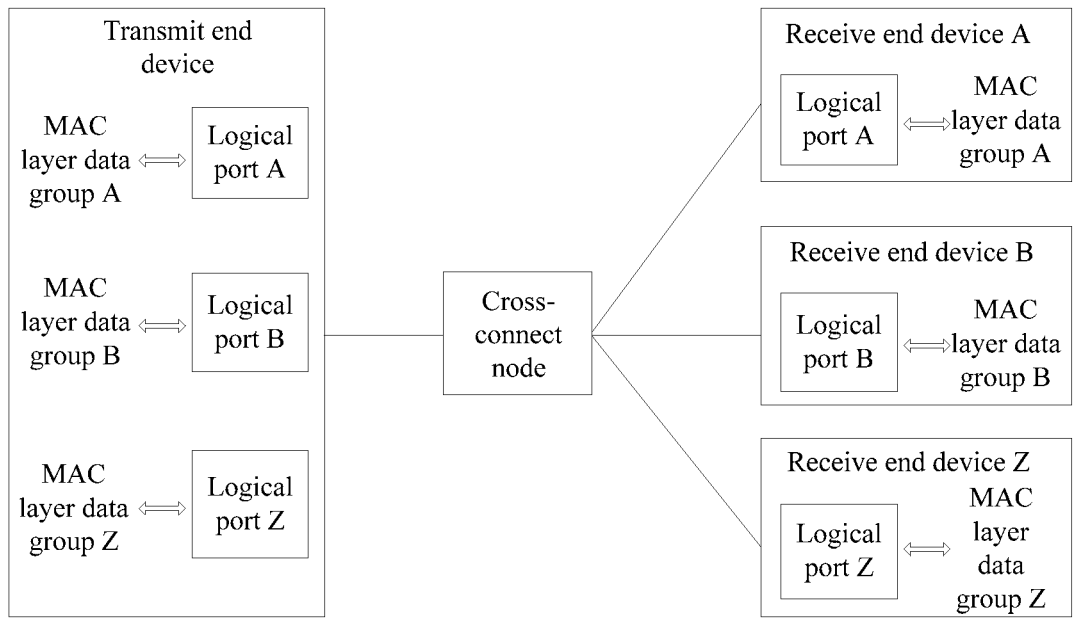
FIG. 8 is a schematic diagram of a logical port connection manner according to another embodiment of the present disclosure.

It should be understood that a point-to-multipoint communication implementation manner shown in FIG. 7 is described merely as an example, and the present disclosure is not limited thereto. Optical carrier scheduling may also be considered to schedule a plurality of MAC layer data groups to different destinations. As shown in FIG. 8, a physical port of a transmit end device may include a logical port A, a logical port B, and a logical port Z, where a service carried on the logical port A is transmitted by using a subcarrier A, a service carried on the logical port B is transmitted by using a subcarrier B, and a service carried on the logical port Z is transmitted by using a subcarrier Z, and the logical ports A, B, and Z are connected to a cross-connect node by using a same optical fiber (for example, the subcarrier A, the subcarrier B, and the subcarrier Z). The cross-connect node may be a wavelength cross-connect processing node and may schedule a plurality of subcarriers to different directions. The subcarrier A, the subcarrier B, and the subcarrier Z are scheduled to a receive end device A, a receive end device B, and a receive end device Z respectively. In addition, when the cross-connect node performs wavelength scheduling, a configuration command may be delivered by a network management system in advance to determine a scheduling direction of each subcarrier, that is, it may be specified by the network management system in advance that the subcarrier A, the subcarrier B, and the subcarrier Z are scheduled to the receive end device A, the receive end device B, and the receive end device Z respectively.

In the data transmission method according to this embodiment of the present disclosure, a plurality of physical channels is divided at a same time to form a plurality of logical ports, so that data can be sent to different receive end devices through different ports, which can implement point-to-multipoint data transmission, thereby communication flexibility of an Ethernet communications system is greatly improved.

In addition, in the data transmission method according to this embodiment of the present disclosure, optical carrier scheduling is used, which, compared with the prior art, which can put an optical subcarrier that is temporarily unneeded to sleep or disable the optical subcarrier, thereby reducing power consumption and saving energy.

In addition, in the data transmission method according to this embodiment of the present disclosure, the number of physical channels included in each logical port varies, which can adapt one Ethernet device to data transmission with a plurality of rate requirements, thereby improving adaptability and communication flexibility of the Ethernet device and saving device costs.

In this embodiment of the present disclosure, after receiving physical layer data, a receive end device may process, at the physical layer, the physical layer data to acquire MAC layer data. Similar to the transmit end device, a physical layer of an Ethernet device (the receive end device) in this embodiment of the present disclosure may include: a reconciliation sublayer, a physical coding sublayer, a media independent interface, a physical medium attachment sublayer, and a physical medium dependent sublayer. The physical medium dependent sublayer is used to receive, through a physical channel, physical layer data sent by a transmit end. The physical medium attachment sublayer is used to implement demultiplexing from a physical channel to a logical channel. The physical coding sublayer is used to deliver physical layer data to a logical channel and perform decoding processing (for example, 64B/66B decoding), descrambling processing, and the like on the physical layer data to generate media independent interface data. The reconciliation sublayer is used to perform reconciliation processing and convert media independent interface data into an Ethernet frame.

It should be understood that the foregoing physical layer structure is described merely as an example, and the present disclosure is not limited thereto.

After receiving data through a physical channel, the receive end device may demultiplex the physical channel to restore all physical layer data.

At the physical coding sublayer, a logical channel corresponding to each piece of physical layer data may be determined, and the physical layer data is processed according to the logical channel to acquire MAC layer data.

For example, code block synchronization header searching processing may be performed for each logical channel to determine a code block border;

alignment marker locking processing is performed on each logical channel and an alignment marker code block is identified by means of comparison with an AM pattern;

alignment and re-sorting processing are performed based on each logical channel to restore an original code block stream; and descrambling processing, FEC processing, and 64B/66B decoding processing are separately performed on each logical channel; these processes are reverse to those in the sending direction. After the 64B/66B decoding processing, an original stream of 8 bits of control information and 64 bits of data information is formed, and Flex MII interface data is further formed.

At the reconciliation sublayer, the Flex MII interface data may be converted into an Ethernet frame that needs to be sent to the MAC layer.

In addition, in this embodiment of the present disclosure, in a case in which the physical layer data is generated after the transmit end device performs processing such as encoding on a plurality of MAC layer data groups, the receive end device further needs to determine a MAC layer data group corresponding to each logical channel.

As described above, the transmit end may add an LPID field to an AM to carry the first indication information. Therefore, the receive end device may extract and compare LPIDs in AMs of the logical channels to determine the MAC layer data groups (or a combination manner of the logical channels) corresponding to the logical channels. As shown in FIG. 7, by extracting LPIDs of the logical channels, it is determined that only the logical channel 1 and the logical channel 2 use A as an LPID, and therefore it is determined that the logical channel 1 and the logical channel 2 are in a same group and carry a same MAC layer data group A; it is determined that only the logical channel 3 uses B as an LPID, and therefore it is determined that only the logical channel 3 carries the MAC layer data group B; and it is determined that only the logical channel 15 and the logical channel 16 use Z as an LPID, and therefore it is determined that the logical channel 15 and the logical channel 16 are in a same group and carry a same MAC layer data group Z.

In the data transmission method according to this embodiment of the present disclosure, grouping is performed on MAC layer data and a logical channel is allocated to each MAC layer data group according to a rate of each MAC layer data group, to perform encoding processing and transmission processing on each MAC layer data group according to the allocated logical channel, which can meet a requirement for an Ethernet network with diversified rate levels and implement interconnection between Ethernet interfaces of different rate levels.

In addition, in the data transmission method according to this embodiment of the present disclosure, a logical channel is allocated according to bandwidth required by a MAC layer data group, which, compared with the prior art, can put a logical channel that is temporarily unneeded to sleep or disable the logical channel when a bandwidth requirement of MAC layer data is low, thereby reducing power consumption and saving energy.

FIG. 9 is a schematic flowchart of a data transmission method 200 according to an embodiment of the present disclosure from a perspective of a receive end device. As shown in FIG. 9, the method 200 includes:

S210: A receive end device receives, at a physical layer, target physical layer data and first indication information that are sent by a target transmit end device of at least one transmit end device.

S220: Determine, from N logical channels according to the first indication information, at least one target logical channel that corresponds to only a target MAC layer data group, where the first indication information is used to indicate a mapping relationship between the target MAC layer data group and the target logical channel, the target MAC layer data group is determined after the target transmit end device performs grouping processing on at least one piece of MAC layer data that comes from a MAC layer, and the target logical channel is allocated by the target transmit end device according to target bandwidth required by the target MAC layer data group and preset reference bandwidth of a logical channel.

S230: Perform decoding processing on the target physical layer data according to the target logical channel to acquire the target MAC layer data group.

Specifically, the receive end device may receive the target physical layer data, where the target physical layer data may be generated and sent in the following manner by the target transmit end device that is communicatively connected to the receive end device, that is:

when receiving a plurality of MAClayer data frames that come from the MAC layer, a physical layer of the target transmit end device may covert the MAC layer data into physical layer data that complies with a format of data transmitted between Ethernet devices.

For example, the target transmit end device may convert, at a reconciliation sublayer, Ethernet frames that come from the MAC layer into data (that is, MAC layer data) that complies with physical layer data transmission, where the MAC layer data may include 8 bits (bit) of control information and 64 bits of data. As shown in FIG. 3, MAC layer data may include a control field and a data field. The control field is used to carry 8 bits of control information and the data field is used to carry 64 bits of data.

In addition, at the reconciliation sublayer, the target transmit end device may perform grouping processing on MAC layer data. As a grouping method, for example, MAC layer data may be divided by destination address, and MAC layer data with a same destination address is added to a same group.

After that, at the reconciliation sublayer, the target transmit end device may determine bandwidth (target bandwidth) required by each MAC layer data group. As a determining method, for example, the target bandwidth of each MAC layer data group may be determined according to a transmission rate of the MAC layer data group (that is, an amount of data of the MAC layer data group, which is received or sent within a unit time).

Then, the target transmit end device may allocate a logical channel to each MAC layer data group. In this embodiment of the present disclosure, this process may be implemented at the reconciliation sublayer, or may be implemented at a physical coding sublayer.

For ease of understanding, as an example rather than a limitation, it is assumed that the target transmit end device in this embodiment of the present disclosure has the following parameters: an Ethernet physical interface with total bandwidth of 400 G is constructed, a bandwidth of a logical channel of the physical coding sublayer (or reference bandwidth of a logical channel) is 25 G, and therefore the physical coding sublayer includes 16 logical channels (that is, N=16).

It is assumed that three MAC layer data groups, namely, a MAC layer data group A (an example of the target MAC layer data group), a MAC layer data group B (another example of the target MAC layer data group), and a MAC layer data group Z (still another example of the target MAC layer data group), are obtained after the foregoing grouping processing.

It is assumed that a traffic bandwidth requirement (target bandwidth) of the MAC layer data group A is 50 G, a traffic bandwidth requirement (target bandwidth) of the MAC layer data group B is 25 G, and a traffic bandwidth requirement (target bandwidth) of the MAC layer data group Z is 50 G.

For example, at the reconciliation sublayer, the target transmit end device may determine that the MAC layer data group A corresponds to two logical channels (for example, a first logical channel and a second logical channel, which are referred to hereinafter as a logical channel 1 and a logical channel 2), the MAC layer data group B corresponds to one logical channel (for example, a third logical channel, which is referred to hereinafter as a logical channel 3), and the MAC layer data group Z corresponds to two logical channels (for example, a fifteenth logical channel and a sixteenth logical channel, which are referred to hereinafter as a logical channel 15 and a logical channel 16). After that, the reconciliation sublayer may send information (an example of second indication information) indicating a logical channel corresponding to each piece of MAC layer data to the physical coding sublayer. In addition, in the foregoing case in which three MAC layer data groups are obtained, the reconciliation sublayer may send, to the physical coding sublayer, information (an example of third indication information) used to indicate a MAC layer data group corresponding to each logical channel of the physical coding sublayer. In addition, data between the reconciliation sublayer and the physical coding sublayer may be transmitted through a media independent interface. The media independent interface may use a time division multiplexing data transmission manner, that is, one period may be divided into N timeslots and the N timeslots correspond to N logical channels of the physical coding sublayer, in other words, in one timeslot, the media independent interface may transmit MAC layer data corresponding to only one logical channel. For example, for the MAC layer data group A, after conversion by the MAC layer data group A, the first 8 bits of control information and 64 bits of data are placed in the first timeslot, the second 8 bits of control information and 64 bits of data are placed in the second timeslot, the third 8 bits of control information and 64 bits of data are placed in the first timeslot, the fourth 8 bits of control information and 64 bits of data are placed in the second timeslot, and so on. Likewise, for the MAC layer data group Z, after conversion by the MAC layer data group Z, the first 8 bits of control information and 64 bits of data are placed in the fifteenth timeslot, the second 8 bits of control information and 64 bits of data are placed in the sixteenth timeslot, the third 8 bits of control information and 64 bits of data are placed in the fifteenth timeslot, the fourth 8 bits of control information and 64 bits of data are placed in the sixteenth timeslot, and so on. Therefore, as a method for transmitting the foregoing second indication information and third indication information, the second indication information and the third indication information may be included in MAC layer data and transmitted to the physical coding sublayer at a same time. FIG. 4 is a schematic diagram of a data format of media independent interface data (that is, MAC layer data) according to another embodiment of the present disclosure. As shown in FIG. 4, a logical channel field and a data group field may be added to a data format of MAC layer data. The logical channel field is used to carry second indication information indicating a logical channel corresponding to MAC layer data of a timeslot. The data group field is used to carry third indication information indicating a MAC layer data group to which the MAC layer data of the timeslot belongs. Therefore, at the physical coding sublayer, the target transmit end device may determine, according to the second indication information, MAC layer data (MAC layer data received in a same timeslot) corresponding to each logical channel, and may determine, according to the third indication information, one or more logical channels corresponding to each MAC layer data group.

For another example, the target transmit end device may determine at the reconciliation sublayer that the MAC layer data group A corresponds to two logical channels, the MAC layer data group B corresponds to one logical channel, and the MAC layer data group Z corresponds to two logical channels. In addition, in the foregoing case in which three MAC layer data groups are obtained, the reconciliation sublayer may send, to the physical coding sublayer, information (an example of third indication information) used to indicate a MAC layer data group corresponding to each logical channel of the physical coding sublayer. In addition, in this embodiment of the present disclosure, data between the reconciliation sublayer and the physical coding sublayer is transmitted through a media independent interface. The media independent interface may use a time division multiplexing (or periodic) data transmission manner, that is, one period may be divided into N timeslots and the N timeslots correspond to N logical channels of the physical coding sublayer, in other words, the media independent interface may transmit MAC layer data corresponding to only one logical channel in one timeslot. For example, for the MAC layer data group A, after conversion by the MAC layer data group A, the first 8 bits of control information and 64 bits of data are placed in the first timeslot, the second 8 bits of control information and 64 bits of data are placed in the second timeslot, the third 8 bits of control information and 64 bits of data are placed in the first timeslot, the fourth 8 bits of control information and 64 bits of data are placed in the second timeslot, and so on. Likewise, for the MAC layer data group Z, after conversion by the MAC layer data group Z, the first 8 bits of control information and 64 bits of data are placed in the fifteenth timeslot, the second 8 bits of control information and 64 bits of data are placed in the sixteenth timeslot, the third 8 bits of control information and 64 bits of data are placed in the fifteenth timeslot, the fourth 8 bits of control information and 64 bits of data are placed in the sixteenth timeslot, and so on. Therefore, as a method for transmitting the foregoing third indication information, the third indication information may be included in MAC layer data and transmitted to the physical coding sublayer. FIG. 4 is a schematic diagram of a data format of media independent interface data (that is, MAC layer data) according to another embodiment of the present disclosure. As shown in FIG. 4, a data group field may be added to a data format of MAC layer data. The data group field is used to carry third indication information indicating a MAC layer data group to which MAC layer data of the timeslot belongs. Therefore, at the physical coding sublayer, the target transmit end device may allocate, according to a received timeslot of each piece of MAC layer data, a same logical channel to MAC layer data received within a same timeslot, and therefore may determine, according to the third indication information, one or more logical channels corresponding to each MAC layer data group.

Therefore, after determining MAC layer data corresponding to each logical channel, at the physical coding sublayer, the target transmit end device may perform encoding processing on data (a stream of 8+64 bits information) of each logical channel. For example, first, 64B/66B encoding may be performed on the stream of 8+64 bits information (information in a control field and a data field) to form a 66B code block stream; after that, forward error correction (FEC) processing may be performed on the 66B code block stream; or encoding and compression processing may be performed again on 66B code blocks selectively, for example, every four 66B code blocks are encoded and converted into one 257B code block, and then FEC processing is performed on a 257B code block stream; and finally, scrambling processing may be performed on a code block stream into which FEC check information is added. For a 66B code block, a 2-bit synchronization header may not be involved in the scrambling processing. It should be noted that, as shown in FIG. 5, 64B/66B encoding processing, FEC processing, and scrambling processing may be performed on the MAC layer data by taking a logical channel as a unit. In this case, it needs to be ensured that processing of logical channels corresponding to a same MAC layer data group is synchronized. Alternatively, as shown in FIG. 6, overall 64B/66B encoding processing, FEC processing, and scrambling processing may be performed on code block streams of logical channels corresponding to a same MAC layer data group by taking a MAC data group as a unit. After that, an alignment marker (AM) may be inserted by taking a MAC layer data group as a unit. In this embodiment of the present disclosure, the AM is inserted based on a certain period, where the period is 16384 code blocks on each logical channel. Respective alignment markers are inserted on logical channels within a MAC layer data group at a same time and the insertion is performed periodically on MAC layer data groups. In addition, the AM is a special pattern. Alignment marker AM patterns inserted on logical channels are different and used for a receive end to differentiate the logical channels. A logical channel number can be identified by using a pattern of an alignment marker code block.

Therefore, data (physical layer data) that complies with physical layer data transmission is generated. That is, by means of the foregoing process, physical layer data A corresponding to the foregoing MAC layer data group A, physical layer data B corresponding to the foregoing MAC layer data group B, and physical layer data C corresponding to the foregoing MAC layer data group C are generated.

After that, at a physical medium attachment sublayer, the target transmit end device may multiplex to one or more physical channels the foregoing determined data corresponding to each logical channel. For example, different MAC layer data groups (or physical layer data) may be multiplexed to different physical channels. In addition, according to a bandwidth requirement of a MAC layer data group, one MAC layer data group may correspond to one or more physical channels. For example, it is assumed that the target transmit end device has a total of four physical channels and each channel has bandwidth of 100 G. For the MAC layer data group A whose bandwidth is 50 G, the logical channel 1 and the logical channel 2 corresponding to the MAC layer data group A may be multiplexed to one physical channel (for example, a physical channel 1). For the MAC layer data group B whose bandwidth is 25 G, the logical channel 3 corresponding to the MAC layer data group B may be multiplexed to one physical channel (for example, a physical channel 2). For the MAC layer data group Z whose bandwidth is 50 G, the logical channel 15 and the logical channel 16 corresponding to the MAC layer data group Z may be multiplexed to one physical channel (for example, a physical channel 3). In addition, in this embodiment of the present disclosure, a multiplexing manner may be bit multiplexing.

In addition, at a physical medium dependent sublayer, for example, the target transmit end device may use a multi-carrier manner to transmit to the receive end device the foregoing physical layer data (including the target physical layer data) that is multiplexed to each physical channel.

Therefore, the receive end device may receive, through a physical channel, the target physical layer data sent by the target transmit end device.

After receiving data through a physical channel, the receive end device may demultiplex the physical channel to restore all physical layer data. It should be noted that, in this embodiment of the present disclosure, in a case in which the physical layer data is generated after the target transmit end device performs processing such as encoding on a plurality of MAC layer data groups, the receive end device further needs to determine a MAC layer data group corresponding to each logical channel. That is:

The determining, from N logical channels, at least one target logical channel that corresponds to only the target physical layer data includes:

receiving the first indication information sent by the target transmit end device, where the first indication information is used to indicate the mapping relationship between the target MAC layer data group and the target logical channel; and determining the target logical channel according to the first indication information.

In addition, the first indication information and the target physical layer data are carried in a same data packet; or the first indication information is sent independent of the target physical layer data.

Specifically, as described above, if a target transmit end device acquires a plurality of MAC layer data groups (the MAC layer data group A, the MAC layer data group B, and the MAC layer data group Z), the target transmit end device further needs to notify (by the first indication information) a receive end device of a MAC layer data group corresponding to each logical channel. As a method for sending the foregoing first indication information, logic port identifier (LPID) information may be added to the foregoing added AM. LPID information added to logical channels corresponding to a same MAC layer data group is consistent, and LPID information added to logical channels corresponding to different MAC layer data groups varies. Therefore, the receive end device can differentiate a MAC layer data group corresponding to each logical channel by identifying LPID information of the logical channel. Specifically, a 66B alignment marker code block is used as an example. As shown in Table 1, there are a total of 66 bits. Block synchronization header information 10 is placed in the first two bits, and the foregoing first indication information is placed in the LPID2 field and the LPID6 field. Information obtained by reversing bits in the LPID2 field is placed in the LPID6 field. Check information of the logical channel is placed in the BIP3 field and the BIP7 field. Alignment pattern information of a logical channel is placed in the M0 field, M1 field, M4 field and M5 field. An LPID field may be added to an AM to carry the first indication information. Therefore, the receive end device may extract and compare LPIDs in AMs of the logical channels to determine the MAC layer data groups (or a combination manner of the logical channels) corresponding to the logical channels. As shown in Table 1, by extracting LPIDs of the logical channels, it is determined that only the logical channel 1 and the logical channel 2 use A as an LPID, and therefore it is determined that the logical channel 1 and the logical channel 2 are in a same group and carry a same MAC layer data group A; it is determined that only the logical channel 3 uses B as an LPID, and therefore it is determined that only the logical channel 3 carries the MAC layer data group B; and it is determined that only the logical channel 15 and the logical channel 16 use Z as an LPID, and therefore it is determined that the logical channel 15 and the logical channel 16 are in a same group and carry a same MAC layer data group Z.

It should be understood that the foregoing method for transmitting the first indication information is described merely as an example, and the present disclosure is not limited thereto. For example, the first indication information and the AM may be sent separately in different time segments. For another example, if only one MAC layer data group exists, the foregoing LPID2 field and LPID6 field may be omitted, and the receive end considers by default that the logical channels correspond to only one same MAC layer data group.

Optionally, the physical layer includes a reconciliation sublayer and a physical coding sublayer;

the determining, from N logical channels according to the first indication information, at least one target logical channel that corresponds to only a target MAC layer data group includes:

determining, at the physical coding sublayer, the target logical channel from the N logical channels according to the first indication information; and the performing decoding processing on the target physical layer data according to the target logical channel to acquire the target MAC layer data group includes:

performing, at the physical coding sublayer, decoding processing on the target physical layer data according to the target logical channel to acquire the target MAC layer data group; and sending, at the physical coding sublayer, the target MAC layer data group to the reconciliation sublayer according to the target logical channel, so that conversion between the physical layer and the MAC layer is performed on the target MAC layer data group at the reconciliation sublayer and data obtained after the conversion is sent to the MAC layer.

Specifically, in this embodiment of the present disclosure, at the physical coding sublayer, the receive end device may perform code block synchronization header searching processing separately for each logical channel to determine a code block border;

perform alignment marker locking processing on each logical channel and identify an alignment marker code block by means of comparison with an AM pattern;

based on each logical channel, perform alignment and re-sorting processing to restore an original code block stream; and perform descrambling processing, FEC processing, and 64B/66B decoding processing separately on each logical channel; these processes are reverse to those in the sending direction. After the 64B/66B decoding processing, an original stream of 8 bits of control information and 64 bits of data information is formed, and Flex MII interface data is further formed.

At the reconciliation sublayer, the Flex MII interface data may be converted into an Ethernet frame that needs to be sent to the MAC layer.

Optionally, the physical layer further includes a media independent interface, where the media independent interface is arranged between the reconciliation sublayer and the physical coding sublayer and used for data transmission between the reconciliation sublayer and the physical coding sublayer by using N timeslots, where one timeslot is used to transmit data in one logical channel; and the sending, at the physical coding sublayer, the target MAC layer data group to the reconciliation sublayer according to the target logical channel includes:

determining, at the physical coding sublayer according to the target logical channel, a target timeslot that is on the media independent interface and used to transmit the target MAC layer data group; and sending, on the media independent interface, the target MAC layer data group to the reconciliation sublayer by using the target timeslot, so that the target MAC layer data group is determined at the reconciliation sublayer according to the target timeslot.

Specifically, data between the reconciliation sublayer and the physical coding sublayer may be transmitted through the media independent interface. The media independent interface may use a time division multiplexing data transmission manner, that is, one period may be divided into N timeslots and the N timeslots correspond to N logical channels of the physical coding sublayer, that is, the media independent interface may transmit MAC layer data corresponding to only one logical channel in one timeslot. For example, for the MAC layer data group A, after conversion by the MAC layer data group A, the first 8 bits of control information and 64 bits of data are placed in the first timeslot, the second 8 bits of control information and 64 bits of data are placed in the second timeslot, the third 8 bits of control information and 64 bits of data are placed in the first timeslot, the fourth 8 bits of control information and 64 bits of data are placed in the second timeslot, and so on. Likewise, for the MAC layer data group Z, after conversion by the MAC layer data group Z, the first 8 bits of control information and 64 bits of data are placed in the fifteenth timeslot, the second 8 bits of control information and 64 bits of data are placed in the sixteenth timeslot, the third 8 bits of control information and 64 bits of data are placed in the fifteenth timeslot, the fourth 8 bits of control information and 64 bits of data are placed in the sixteenth timeslot, and so on.

Optionally, the performing decoding processing on the target physical layer data according to the target logical channel to acquire the target MAC layer data group includes:

performing, at the physical coding sublayer, decoding processing on the target physical layer data according to the target logical channel to acquire the MAC target layer data group;

sending, at the physical coding sublayer, third indication information to the reconciliation sublayer, where the third indication information is used to indicate the mapping relationship between the target MAC layer data group and the target logical channel; and determining, at the reconciliation sublayer, the target MAC layer data group according to the third indication information.

Specifically, in the foregoing case in which three MAC layer data groups are obtained, the physical coding sublayer may send, to the reconciliation sublayer, information used to indicate a MAC layer data group corresponding to each logical channel of the physical coding sublayer (an example of the third indication information). Therefore, the reconciliation sublayer may determine, according to the second indication information, MAC layer data (MAC layer data received in a same timeslot) corresponding to each logical channel, and may determine, according to the third indication information, one or more logical channels corresponding to each MAC layer data group.

In addition, in this embodiment of the present disclosure, one or more logical ports may be configured at the physical layer (for example, the physical medium dependent sublayer), where one logical port may include one or more physical channels and physical channels included in different logical ports are different. Herein, the numbers of physical channels included in different logical ports may be the same or may be different, and the present disclosure poses no particular limitation thereon.

In addition, the receive end device may include a plurality of physical channels in a plurality of logical ports, and one logical port may correspond to only one transmit end device, that is, the logical port is only used to transmit data that comes from the transmit end device. It should be noted that, in this embodiment of the present disclosure, one transmit end device may have a plurality of corresponding logical interfaces or may have only one corresponding logical interface, and the present disclosure poses no particular limitation thereon.

In the data transmission method according to this embodiment of the present disclosure, a plurality of physical channels is divided to form a plurality of logical ports, so that data sent by different transmit end devices can be received through different ports, which can implement point-to-multipoint data transmission, thereby greatly improving communication flexibility of an Ethernet communications system.

In addition, in the data transmission method according to this embodiment of the present disclosure, the number of physical channels included in each logical port varies, which can adapt one Ethernet device to data transmission with a plurality of rate requirements, thereby improving adaptability and communication flexibility of the Ethernet device and saving device costs.

In the data transmission method according to this embodiment of the present disclosure, grouping is performed on MAC layer data and a logical channel is allocated to each MAC layer data group according to a rate of each MAC layer data group, to perform encoding processing and transmission processing on each MAC layer data group according to the allocated logical channel, which can meet a requirement for an Ethernet network with diversified rate levels and implement interconnection between Ethernet interfaces of different rate levels.

In addition, in the data transmission method according to this embodiment of the present disclosure, a logical channel is allocated according to bandwidth required by a MAC layer data group, which, compared with the prior art, can put a logical channel that is temporarily unneeded to sleep or disable the logical channel when a bandwidth requirement of MAC layer data is low, thereby reducing power consumption and saving energy.

The foregoing describes in detail the data transmission method according to the embodiments of the present disclosure with reference to FIG. 1 to FIG. 9. The following describes in detail a data transmission apparatus according to embodiments of the present disclosure with reference to FIG. 10 to FIG. 11.

Figure 10:
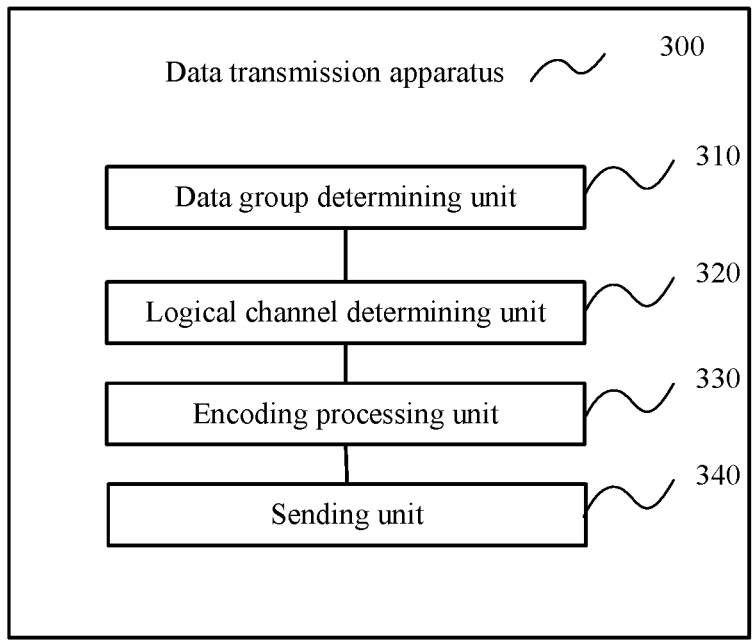
FIG. 10 is a schematic block diagram of a data transmission apparatus according to an embodiment of the present disclosure.

FIG. 10 is a schematic block diagram of a data transmission apparatus 300 according to an embodiment of the present disclosure. As shown in FIG. 10, the apparatus 300 includes:

a data group determining unit 310, configured to perform, at a physical layer, grouping processing on at least one piece of MAC layer data that comes from a MAC layer, to determine at least one MAC layer data group;

a logical channel determining unit 320, configured to allocate, according to target bandwidth required by a target MAC layer data group of the at least one MAC layer data group determined by the data group determining unit 310 and preset reference bandwidth of a logical channel, at least one target logical channel from N logical channels to the target MAC layer data group, so that the target logical channel corresponds to only the target MAC layer data group;

an encoding processing unit 330, configured to perform encoding processing on the target MAC layer data group according to the target logical channel determined by the logical channel determining unit 320 to generate target physical layer data, where the target logical channel corresponds to only the target physical layer data; and a sending unit 340, configured to send the target physical layer data generated by the encoding processing unit 330 and first indication information to a target receive end device of at least one receive end device, where the first indication information is used to indicate a mapping relationship between the target MAC layer data group and the target logical channel.

Optionally, the sending unit 340 is configured to determine a target logical port from at least one logical port, where one logical port corresponds to at least one physical channel; and send the target physical layer data to the target receive end device through a physical channel corresponding to the target logical port.

Optionally, the data transmission apparatus 300 is communicatively connected to at least two receive end devices, and the data transmission apparatus 300 includes at least two logical ports, where one logical port corresponds to one receive end device; and the sending unit 340 is configured to determine, from a preset mapping relationship between the at least two receive end devices and the at least two logical ports, the target logical port according to the target receive end device.

Optionally, the physical layer includes a reconciliation sublayer and a physical coding sublayer;

the logical channel determining unit 320 is configured to determine, at the reconciliation sublayer, the target logical channel according to the target bandwidth and the reference bandwidth, and send second indication information to the physical coding sublayer, where the second indication information is used to indicate the target logical channel; and the encoding processing unit 330 is configured to determine, at the physical coding sublayer, the target logical channel according to the second indication information, and perform encoding processing on the target MAC layer data group according to the target logical channel.

Optionally, the physical layer includes a reconciliation sublayer, a media independent interface, and a physical coding sublayer, where the media independent interface is arranged between the reconciliation sublayer and the physical coding sublayer and used for data transmission between the reconciliation sublayer and the physical coding sublayer by using N timeslots, where one timeslot is used to transmit data in one logical channel; and the logical channel determining unit 320 is configured to determine, at the reconciliation sublayer according to the target bandwidth and the reference bandwidth, the number of target logical channels and the number of target timeslots on the media independent interface which are used to transmit the target MAC layer data group;

send, on the media independent interface, the target MAC layer data group to the physical coding sublayer by using the target timeslots; and allocate, at the physical coding sublayer, a logical channel to the target MAC layer data group as the target logical channel according to the number of the target timeslots.

The encoding processing unit 330 is configured to perform, at the physical coding sublayer, encoding processing on the target MAC layer data group according to the target logical channel.

Optionally, the logical channel determining unit 320 is configured to send, at the reconciliation sublayer, third indication information to the physical coding sublayer, where the third indication information is used to indicate the mapping relationship between the target MAC layer data group and the target logical channel.

Optionally, the encoding processing unit 330 is configured to perform encoding processing on the target MAC layer data group by taking a target logical channel as a unit to generate the target physical layer data.

Optionally, the encoding processing unit 330 is configured to take the at least one target logical channel corresponding to the target MAC layer data group as one group, and perform encoding processing on the target MAC layer data group by taking a group as a unit, to generate the target physical layer data.

Optionally, the first indication information and the target physical layer data are carried in a same data packet; or the first indication information is sent independent of the target physical layer data.

The data transmission apparatus 300 according to this embodiment of the present disclosure may correspond to the transmit end device (or the target transmit end device) in the method in the embodiments of the present disclosure. In addition, the units, that is, the modules, in the data transmission apparatus 300 and the foregoing other operations and/or functions are intended to implement a corresponding procedure of the method 100 in FIG. 1, which are not described herein again for brevity.

By using the data transmission apparatus according to this embodiment of the present disclosure, grouping is performed on MAC layer data and a logical channel is allocated to each MAC layer data group according to a rate of each MAC layer data group, to perform encoding processing and transmission processing on each MAC layer data group according to the allocated logical channel, which can meet a requirement for an Ethernet network with diversified rate levels and implement interconnection between Ethernet interfaces of different rate levels.

In addition, by using the data transmission apparatus according to this embodiment of the present disclosure, a logical channel is allocated according to bandwidth required by a MAC layer data group, which, compared with the prior art, can put a logical channel that is temporarily unneeded to sleep or disable the logical channel when a bandwidth requirement of MAC layer data is low, thereby reducing power consumption and saving energy.

Figure 11:
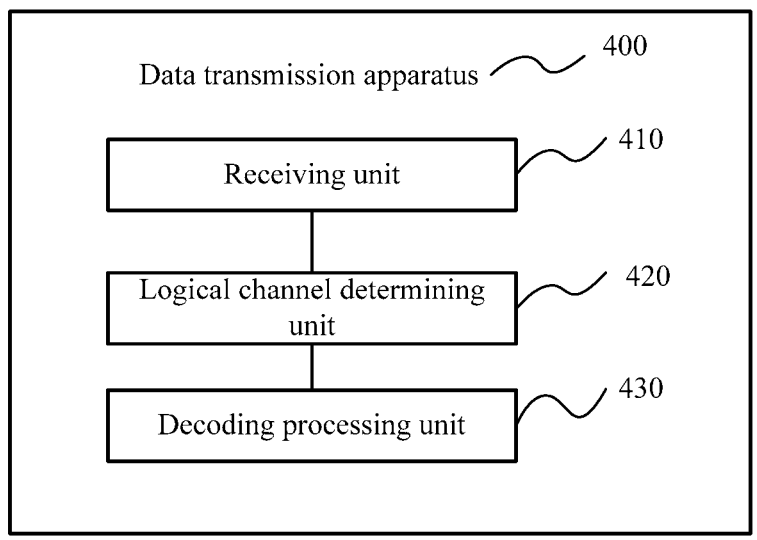
FIG. 11 is a schematic block diagram of a data transmission apparatus according to another embodiment of the present disclosure.

FIG. 11 is a schematic block diagram of a data transmission apparatus 400 according to an embodiment of the present disclosure. As shown in FIG. 11, the apparatus 400 includes:

a receiving unit 410, configured to receive, at a physical layer, target physical layer data and first indication information that are sent by a target transmit end device of at least one transmit end device;

a logical channel determining unit 420, configured to determine, from N logical channels according to the first indication information acquired by the receiving unit 410, at least one target logical channel that corresponds to only a target MAC layer data group, where the first indication information is used to indicate a mapping relationship between the target MAC layer data group and the target logical channel, the target MAC layer data group is determined after the target transmit end device performs grouping processing on at least one piece of MAC layer data that comes from a MAC layer, and the target logical channel is allocated by the target transmit end device according to target bandwidth required by the target MAC layer data group and preset reference bandwidth of a logical channel; and a decoding processing unit 430, configured to perform, according to the target logical channel determined by the logical channel determining unit 420, decoding processing on the target physical layer data received by the receiving unit 410 to acquire the target MAC layer data group.

Optionally, the first indication information and the target physical layer data are carried in a same data packet; or the first indication information is sent independent of the target physical layer data.

Optionally, the physical layer includes a reconciliation sublayer and a physical coding sublayer;

the logical channel determining unit 420 is configured to determine, at the physical coding sublayer, the target logical channel from the N logical channels according to the first indication information; and the decoding processing unit 430 is configured to perform, at the physical coding sublayer, decoding processing on the target physical layer data according to the target logical channel to acquire the target MAC layer data group; and send, at the physical coding sublayer, the target MAC layer data group to the reconciliation sublayer according to the target logical channel, so that conversion between the physical layer and the MAC layer is performed on the target MAC layer data group at the reconciliation sublayer and data obtained after the conversion is sent to the MAC layer.

Optionally, the physical layer further includes a media independent interface, where the media independent interface is arranged between the reconciliation sublayer and the physical coding sublayer and used for data transmission between the reconciliation sublayer and the physical coding sublayer by using N timeslots, where one timeslot is used to transmit data in one logical channel; and the decoding processing unit 430 is configured to determine, at the physical coding sublayer according to the target logical channel, a target timeslot that is on the media independent interface and used to transmit the target MAC layer data group; and send, on the media independent interface, the target MAC layer data group to the reconciliation sublayer by using the target timeslot, so that the target MAC layer data group is determined at the reconciliation sublayer according to the target timeslot.

Optionally, the decoding processing unit 430 is configured to perform, at the physical coding sublayer, decoding processing on the target physical layer data according to the target logical channel to acquire the target MAC layer data group; and send, at the physical coding sublayer, third indication information to the reconciliation sublayer, where the third indication information is used to indicate the mapping relationship between the target MAC layer data group and the target logical channel; and determine, at the reconciliation sublayer, the target MAC layer data group according to the third indication information.

Optionally, the decoding processing unit 430 is configured to take the target logical channel corresponding to the target physical layer data as one group, and perform decoding processing on the target physical layer data group by taking a group as a unit, to generate the target MAC layer data group.

The data transmission apparatus 400 according to this embodiment of the present disclosure may correspond to the receive end device (or the target receive end device) in the method in the embodiments of the present disclosure. In addition, the units, that is, the modules, in the data transmission apparatus 400 and the foregoing other operations and/or functions are intended to implement a corresponding procedure of the method 200 in FIG. 9, which are not described herein again for brevity.

By using the data transmission apparatus according to this embodiment of the present disclosure, grouping is performed on MAC layer data and a logical channel is allocated to each MAC layer data group according to a rate of each MAC layer data group, to perform encoding processing and transmission processing on each MAC layer data group according to the allocated logical channel, which can meet a requirement for an Ethernet network with diversified rate levels and implement interconnection between Ethernet interfaces of different rate levels.

In addition, by using the data transmission apparatus according to this embodiment of the present disclosure, a logical channel is allocated according to bandwidth required by a MAC layer data group, which, compared with the prior art, can put a logical channel that is temporarily unneeded to sleep or disable the logical channel when a bandwidth requirement of MAC layer data is low, thereby reducing power consumption and saving energy.

The foregoing describes in detail the data transmission method according to the embodiments of the present disclosure with reference to FIG. 1 to FIG. 9. The following describes in detail a data transmission device according to embodiments of the present disclosure with reference to FIG. 12 to FIG. 13.

Figure 12:
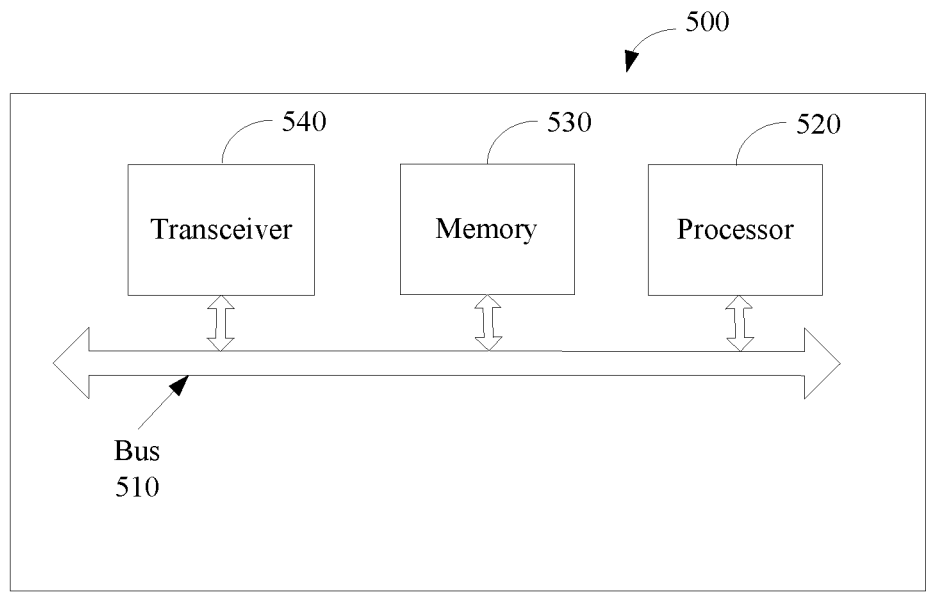
FIG. 12 is a schematic structure of a data transmission device according to an embodiment of the present disclosure.

FIG. 12 is a schematic block diagram of a data transmission device 500 according to an embodiment of the present disclosure. As shown in FIG. 12, the device 500 includes:

a bus 510;
a processor 520 connected to the bus 510;
a memory 530 connected to the bus 510; and
a transceiver 540 connected to the bus 510.

The processor 520 invokes, through the bus 510, a program stored in the memory 530 to perform, at a physical layer, grouping processing on at least one piece of MAC layer data that comes from a MAC layer, to determine at least one MAC layer data group;

allocate, according to target bandwidth required by a target MAC layer data group and preset reference bandwidth of a logical channel, at least one target logical channel from N logical channels to the target MAC layer data group, so that the target logical channel corresponds to only the target MAC layer data group;

perform encoding processing on the target MAC layer data group according to the target logical channel to generate target physical layer data, where the target logical channel corresponds to only the target physical layer data; and control the transceiver 540 to send the target physical layer data and first indication information to a target receive end device of at least one receive end device, where the first indication information is used to indicate a mapping relationship between the target physical layer data and the target logical channel.

Optionally, the first indication information and the target physical layer data are carried in a same data packet; or the first indication information is sent independent of the target physical layer data.

Optionally, the processor 520 is configured to determine a target logical port from at least one logical port, where one logical port corresponds to at least one physical channel; and control the transceiver 540 to send, through a physical channel corresponding to the target logical port, the target physical layer data to the target receive end device.

Optionally, the data transmission device 500 is communicatively connected to at least two receive end devices, and the data transmission device 500 includes at least two logical ports, where one logical port corresponds to one receive end device; and the processor 520 is configured to determine, from a preset mapping relationship between the at least two receive end devices and the at least two logical ports, the target logical port according to the target receive end device.

Optionally, the physical layer includes a reconciliation sublayer and a physical coding sublayer; and the processor 520 is configured to determine, at the reconciliation sublayer, the target logical channel according to the target bandwidth and the reference bandwidth, and send second indication information to the physical coding sublayer, where the second indication information is used to indicate the target logical channel; and determine, at the physical coding sublayer, the target logical channel according to the second indication information, and perform encoding processing on the target MAC layer data group according to the target logical channel.

Optionally, the physical layer includes a reconciliation sublayer, a media independent interface, and a physical coding sublayer, where the media independent interface is arranged between the reconciliation sublayer and the physical coding sublayer and used for data transmission between the reconciliation sublayer and the physical coding sublayer by using N timeslots, where one timeslot is used to transmit data in one logical channel; and the processor 520 is configured to determine, at the reconciliation sublayer according to the target bandwidth and the reference bandwidth, the number of target logical channels and the number of target timeslots on the media independent interface which are used to transmit the target MAC layer data group;

send, on the media independent interface, the target MAC layer data group to the physical coding sublayer by using the target timeslots;

allocate, at the physical coding sublayer, a logical channel to the target MAC layer data group as the target logical channel according to the number of the target timeslots; and perform, at the physical coding sublayer, encoding processing on the target MAC layer data group according to the target logical channel.

Optionally, the processor 520 is further configured to send, at the reconciliation sublayer, third indication information to the physical coding sublayer, where the third indication information is used to indicate a mapping relationship between the target MAC layer data group and the target logical channel.

Optionally, the processor 520 is configured to take the at least one target logical channel corresponding to the target MAC layer data group as one group, and perform encoding processing on the target MAC layer data group by taking a group as a unit, to generate the target physical layer data.

It should be understood that, in this embodiment of the present disclosure, the processor 520 may be a central processing unit ("CPU" for short), or the processor 520 may be any other general-purpose processor, a digital signal processor (DSP), an application specific integrated circuit (ASIC), a field-programmable gate array (FPGA) or any other programmable logic device, a discrete gate or a transistor logic device, a discrete hardware component, or the like. The general-purpose processor may be a microprocessor, or the processor may be any conventional processor or the like.

The memory 530 may include a read-only memory 530 and a random access memory 530, and provide an instruction and data for the processor 520. A part of the memory 530 may further include a non-volatile random access memory 530. For example, the memory 530 may further store information about a device type.

In addition to a data bus, the bus 510 may further include a power bus, a control bus, a status signal bus, and the like. However, for clear description, all buses are marked as the bus 510 in the figure.

During an implementation process, the steps in the foregoing method may be completed by an integrated logic circuit of hardware in the processor 520 or an instruction in a form of software. The steps of the method disclosed with reference to the embodiments of the present disclosure may be executed directly by the hardware processor 520, or may be executed by a combination of hardware and a software module in the processor 520. The software module may be located in a mature storage medium in the art, such as a random memory, a flash memory, a read-only memory, a programmable read-only memory, an electrically erasable programmable memory, or a register. The storage medium is located in the memory 530. The processor 520 reads information in the memory 530 and completes the steps in the foregoing method in combination with the hardware of the processor 520. To avoid repetition, details are not described herein again.

The data transmission device 500 according to this embodiment of the present disclosure may correspond to the transmit end device (or the target transmit end device) in the method in the embodiments of the present disclosure. In addition, the units, that is, the modules, in the data transmission device 500 and the foregoing other operations and/or functions are intended to implement a corresponding procedure of the method 100 in FIG. 1, which are not described herein again for brevity.

By using the data transmission device according to this embodiment of the present disclosure, grouping is performed on MAC layer data and a logical channel is allocated to each MAC layer data group according to a rate of each MAC layer data group, to perform encoding processing and transmission processing on each MAC layer data group according to the allocated logical channel, which can meet a requirement for an Ethernet network with diversified rate levels and implement interconnection between Ethernet interfaces of different rate levels.

In addition, by using the data transmission device according to this embodiment of the present disclosure, a logical channel is allocated according to bandwidth required by a MAC layer data group, which, compared with the prior art, can put a logical channel that is temporarily unneeded to sleep or disable the logical channel when a bandwidth requirement of MAC layer data is low, thereby reducing power consumption and saving energy.

Figure 13:
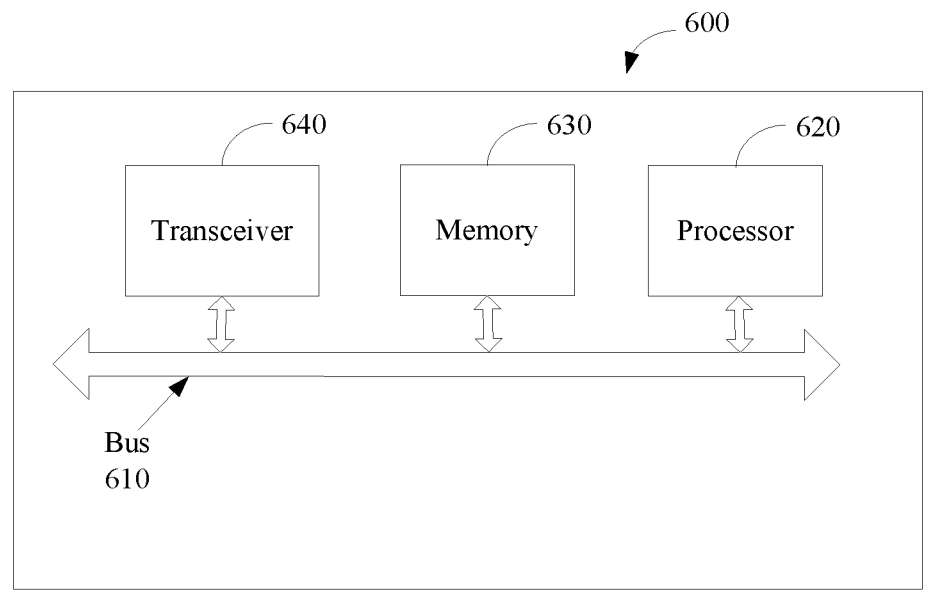
FIG. 13 is a schematic structure of a data transmission device according to another embodiment of the present disclosure.

FIG. 13 is a schematic block diagram of a data transmission device 600 according to an embodiment of the present disclosure. As shown in FIG. 13, the device 600 includes:

a bus 610;

a processor 620 connected to the bus 610;

a memory 630 connected to the bus 610; and a transceiver 640 connected to the bus 610.

The processor 620 invokes, through the bus 610, a program stored in the memory 630 to control the transceiver 640 to receive, at a physical layer, target physical layer data and first indication information that are sent by a target transmit end device of at least one transmit end device;

determine, from N logical channels according to the first indication information, at least one target logical channel that corresponds to only the target physical layer data, where the first indication information is used to indicate a mapping relationship between the target physical layer data and the target logical channel; and perform decoding processing on the target physical layer data according to the target logical channel to acquire a target MAC layer data group, where the target MAC layer data group is determined after the target transmit end device perform grouping processing on at least one piece of MAC layer data that comes from a MAC layer, and the target logical channel is allocated by the target transmit end device according to target bandwidth required by the target MAC layer data group and preset reference bandwidth of a logical channel.

Optionally, the first indication information and the target physical layer data are carried in a same data packet; or the first indication information is sent independent of the target physical layer data.

Optionally, the physical layer includes a reconciliation sublayer and a physical coding sublayer; and the processor 620 is configured to determine, at the physical coding sublayer, the target logical channel from the N logical channels according to the first indication information;

perform, at the physical coding sublayer, decoding processing on the target physical layer data according to the target logical channel to acquire the target MAC layer data group; and send, at the physical coding sublayer, the target MAC layer data group to the reconciliation sublayer according to the target logical channel, so that conversion between the physical layer and the MAC layer is performed on the target MAC layer data group at the reconciliation sublayer and data obtained after the conversion is sent to the MAC layer.

Optionally, the physical layer further includes a media independent interface, where the media independent interface is arranged between the reconciliation sublayer and the physical coding sublayer and used for data transmission between the reconciliation sublayer and the physical coding sublayer by using N timeslots, where one timeslot is used to transmit data in one logical channel; and the processor 620 is configured to determine, at the physical coding sublayer according to the target logical channel, a target timeslot that is on the media independent interface and used to transmit the target MAC layer data group; and send, on the media independent interface, the target MAC layer data group to the reconciliation sublayer by using the target timeslot, so that the target MAC layer data group is determined at the reconciliation sublayer according to the target timeslot.

Optionally, the processor 620 is configured to perform, at the physical coding sublayer, decoding processing on the target physical layer data according to the target logical channel to acquire the target MAC layer data group;

send, at the physical coding sublayer, third indication information to the reconciliation sublayer, where the third indication information is used to indicate a mapping relationship between the target MAC layer data group and the target logical channel; and determine, at the reconciliation sublayer, the target MAC layer data group according to the third indication information.

Optionally, the processor 620 is configured to take the target logical channel corresponding to the target physical layer data as one group, and perform decoding processing on the target physical layer data group by taking a group as a unit, to generate the target MAC layer data group.

It should be understood that, in this embodiment of the present disclosure, the processor 620 may be a central processing unit (CPU), or the processor 620 may be any other general-purpose processor, a digital signal processor (DSP), an application specific integrated circuit (ASIC), a field-programmable gate array (FPGA) or any other programmable logic device, a discrete gate or a transistor logic device, a discrete hardware component, or the like. The general-purpose processor may be a microprocessor, or the processor may be any conventional processor or the like.

The memory 630 may include a read-only memory 630 and a random access memory 630, and provide an instruction and data for the processor 620. A part of the memory 630 may further include a non-volatile random access memory 630. For example, the memory 630 may further store information about a device type.

In addition to a data bus, the bus 610 may further include a power bus, a control bus, a status signal bus, and the like. However, for clear description, all buses are marked as the bus 610 in the figure.

During an implementation process, the steps in the foregoing method may be completed by an integrated logic circuit of hardware in the processor 620 or an instruction in a form of software. The steps of the method disclosed with reference to the embodiments of the present disclosure may be executed directly by the hardware processor 620, or may be executed by a combination of hardware and a software module in the processor 620. The software module may be located in a mature storage medium in the art, such as a random memory, a flash memory, a read-only memory, a programmable read-only memory, an electrically erasable programmable memory, or a register. The storage medium is located in the memory 630. The processor 620 reads information in the memory 630 and completes the steps in the foregoing method in combination with the hardware of the processor 620. To avoid repetition, details are not described herein again.

The data transmission device 600 according to this embodiment of the present disclosure may correspond to the receive end device (or the target receive end device) in the method in the embodiments of the present disclosure. In addition, the units, that is, the modules, in the data transmission device 600 and the foregoing other operations and/or functions are intended to implement a corresponding procedure of the method 200 in FIG. 9, which are not described herein again for brevity.

By using the data transmission device according to this embodiment of the present disclosure, grouping is performed on MAC layer data and a logical channel is allocated to each MAC layer data group according to a rate of each MAC layer data group, to perform encoding processing and transmission processing on each MAC layer data group according to the allocated logical channel, which can meet a requirement for an Ethernet network with diversified rate levels and implement interconnection between Ethernet interfaces of different rate levels.

In addition, by using the data transmission device according to this embodiment of the present disclosure, a logical channel is allocated according to bandwidth required by a MAC layer data group, which, compared with the prior art, can put a logical channel that is temporarily unneeded to sleep or disable the logical channel when a bandwidth requirement of MAC layer data is low, thereby reducing power consumption and saving energy.

It should be understood that, in the embodiments of the present disclosure, each Ethernet device in an Ethernet communications system may integrate functions of both a transmit end device and a receive end device in the embodiments of the present disclosure, or a single Ethernet device may execute both the data transmission method 100 and the data transmission method 200 in the embodiments of the present disclosure, and the present disclosure poses no particular limitation thereon.

It should be understood that, in the embodiments of the present disclosure, sequence numbers of the foregoing processes do not mean execution sequences. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A data transmission method, applied to a processor and a transmitter of a device, the method is performed in an Ethernet physical interface of the device, and the Ethernet physical interface comprises a media access control (MAC) layer and a physical layer, and the method comprising:
   allocating, by the processor, according to a bandwidth required by MAC layer data and a bandwidth of a logical channel included in a physical coding sublayer (PCS) of the physical layer, one or multiple logical channels included in the PCS of the physical layer,
      wherein the one or multiple logical channels is used to carry the MAC layer data, and
      wherein the logical channels included in the PCS of the physical layer are time division multiplexed and have a same fixed bandwidth;
   encoding, by the processor, the MAC layer data to generate physical layer data; and
   sending, by the transmitter, over the one or multiple logical channels included in the PCS of the physical layer, the physical layer data and indication information to a receiving device, wherein the indication information indicates a relationship between the MAC layer data and the one or multiple logical channels included in the PCS of the physical layer, the indication information comprises a logical port identifier (LPID).

2. The method according to claim 1, wherein allocating the one or multiple logical channels comprises:
   determining a number of the one or multiple logical channels by the following: the bandwidth required by the MAC layer data divided by the bandwidth of a logical channel included in the PCS of the physical layer.

3. The method according to claim 2, wherein encoding the MAC layer data comprises at least one of the following: block encoding, forward error correction (FEC) and scrambling.

4. The method according to claim 2, wherein the physical layer data and the indication information are carried in a same data packet.

5. The method according to claim 1, wherein encoding the MAC layer data comprises at least one of the following: block encoding, forward error correction (FEC) and scrambling.

6. The method according to claim 1, wherein the physical layer data and the indication information are carried in a same data packet.

7. A device comprising:
a processor configured to:
allocate, according to a bandwidth required by media access control (MAC) layer data and a bandwidth of a logical channel included in a physical coding sublayer (PCS) of a physical layer of an Ethernet physical interface of the device, one or multiple logical channels included in the PCS of the physical layer,
wherein the one or multiple logical channels is used to carry the MAC layer data, and
wherein the logical channels included in the PCS of the physical layer are time division multiplexed and have a same fixed bandwidth; and
encode the MAC layer data to generate physical layer data; and
a transmitter configured to cooperate with the processor to send, through the one or multiple logical channels included in the PCS of the physical layer, the physical layer data and indication information to a receive end device,
wherein the indication information specifies a relationship between the MAC layer data and the one or more logical channels included in the PCS of the physical layer, wherein the indication information comprises a logical port identifier (LPID).

8. The device according to claim 7, wherein allocating the one or more logical channels included in the PCS of the physical layer comprises:
determining a number of the one or multiple logical channels by the following: the bandwidth required by the MAC layer data divided by the bandwidth of a logical channel included in the PCS of the physical layer.

9. The device according to claim 8, wherein encoding the MAC layer data comprises at least one of the following: block encoding, forward error correction (FEC) and scrambling.

10. The device according to claim 7, wherein encoding the MAC layer data comprises at least one of the following: block encoding, forward error correction (FEC) and scrambling.

11. The device according to claim 7, wherein the physical layer data and the indication information are carried in a same data packet.

12. A system comprising a sending device and a receiving device connected via one or multiple of physical channels, wherein
each one of the one or multiple physical channels is divided into multiple logical channels with a bandwidth;
the sending device is configured to:
allocate, according to a bandwidth required by media access control (MAC) layer data and a bandwidth of a logical channel, one or multiple logical channels included in a physical coding sublayer (PCS) of a physical channel of an Ethernet physical interface of the sending device, wherein the one or multiple logical channels is used to carry the group of MAC layer data, wherein the logical channels included in the PCS of the physical layer are time division multiplexed and have a same fixed bandwidth; and
encode the MAC layer data to generate physical layer data; and
send, through the one or multiple logical channels included in the PCS of the physical layer, the physical layer data and indication information to the receiving device, wherein the indication information indicates a relationship between the MAC layer data and the one or more logical channels, wherein the indication information comprises a logical port identifier (LPID).

13. The system according to claim 12, wherein the physical layer data and the indication information are carried in a same data packet.

14. The system according to claim 12, wherein encoding the MAC layer data comprises at least one of the following: block encoding, forward error correction (FEC) and scrambling.

15. The system according to claim 12, wherein allocating the one or more logical channels included in the PCS of the physical layer comprises:
determining a number of the one or multiple logical channels by the following: the bandwidth required by the MAC layer data divided by the bandwidth of a logical channel included in the PCS of the physical layer.

* * * * *